US008560441B2

(12) United States Patent
Schulz

(10) Patent No.: US 8,560,441 B2
(45) Date of Patent: Oct. 15, 2013

(54) MANAGING VARIABLE TO FIXED PAYMENTS IN AN INTERNATIONAL ACH

(75) Inventor: Larry Schulz, Atlanta, GA (US)

(73) Assignee: Federal Reserve Bank of Atlanta, Atlanta, GA (US)

( * ) Notice: Subject to any disclaimer, the term of this patent is extended or adjusted under 35 U.S.C. 154(b) by 972 days.

(21) Appl. No.: 12/148,204

(22) Filed: Apr. 17, 2008

(65) Prior Publication Data

US 2008/0195537 A1 Aug. 14, 2008

Related U.S. Application Data

(62) Division of application No. 11/224,380, filed on Sep. 12, 2005, now Pat. No. 7,580,886.

(60) Provisional application No. 60/610,014, filed on Sep. 15, 2004.

(51) Int. Cl.
*G06Q 40/00* (2012.01)
(52) U.S. Cl.
USPC ............................................................ 705/39
(58) Field of Classification Search
CPC .............................. G06Q 20/10; G06Q 20/381
USPC ............................................................ 705/39
See application file for complete search history.

(56) References Cited

U.S. PATENT DOCUMENTS

| | | | |
|---|---|---|---|
| 4,270,042 A | 5/1981 | Case | |
| 4,727,243 A | 2/1988 | Savar | |
| 4,823,264 A | 4/1989 | Deming | |
| 5,121,945 A | 6/1992 | Thomson | |
| 5,175,682 A | 12/1992 | Higashiyama et al. | |
| 5,448,043 A | 9/1995 | Nakano et al. | |
| 5,532,464 A | 7/1996 | Josephson et al. | |
| 5,691,524 A | 11/1997 | Josephson | |
| 5,717,868 A | 2/1998 | James | |
| 5,742,819 A | 4/1998 | Caccavale | |

(Continued)

FOREIGN PATENT DOCUMENTS

| | | |
|---|---|---|
| WO | WO 00/30053 | 5/2000 |
| WO | WO0030053 | 5/2000 |
| WO | WO 01/86546 | 11/2001 |

OTHER PUBLICATIONS

Lang, Scott M., "Getting Online to Pay", Jan./Feb. 1997, Financial Executive, ABI/INFORM Global.*

(Continued)

*Primary Examiner* — Eric T Wong
(74) *Attorney, Agent, or Firm* — King & Spalding

(57) ABSTRACT

Managing foreign payments in an International ACH. An originating depository financial institution ("ODFI") can create an ACH item designating a fixed amount of foreign currency to be credited to, or a fixed amount of domestic currency to be debited from, a receiving depository financial institution. In a variable to fixed payment, a conversion module of the ODFI or a gateway operator can determine a foreign exchange ("FX") conversion rate. Using the FX conversion rate, the conversion module can calculate a domestic currency amount or a foreign currency amount corresponding to the desired foreign/domestic currency payment. The conversion module can enter the FX conversion rate and/or the determined domestic/foreign currency amount into the ACH item for processing via the International ACH. In a fixed to fixed payment, the ODFI can transmit information about the foreign currency payment via the International ACH and settle the payment via ACH or non-ACH means.

32 Claims, 13 Drawing Sheets

(56) References Cited

U.S. PATENT DOCUMENTS

| | | | |
|---|---|---|---|
| 5,761,510 A | 6/1998 | Smith et al. |
| 5,783,808 A | 7/1998 | Josephson |
| 5,787,402 A | 7/1998 | Potter et al. |
| 5,790,778 A | 8/1998 | Bush et al. |
| 5,794,234 A | 8/1998 | Church et al. |
| 5,825,003 A | 10/1998 | Jennings et al. |
| 5,848,400 A | 12/1998 | Chang |
| 5,852,812 A | 12/1998 | Reeder |
| 5,903,878 A | 5/1999 | Talati et al. |
| 5,940,813 A | 8/1999 | Hutchings |
| 5,946,669 A | 8/1999 | Polk |
| 5,956,700 A | 9/1999 | Landry |
| 5,963,647 A | 10/1999 | Downing et al. |
| 5,963,648 A | 10/1999 | Rosen |
| 5,978,485 A | 11/1999 | Rosen |
| 6,026,379 A | 2/2000 | Haller et al. |
| 6,032,133 A | 2/2000 | Hilt et al. |
| 6,061,665 A | 5/2000 | Bahreman |
| 6,076,064 A | 6/2000 | Rose |
| 6,076,074 A | 6/2000 | Cotton et al. |
| 6,098,053 A | 8/2000 | Slater |
| 6,119,107 A | 9/2000 | Polk |
| 6,141,651 A | 10/2000 | Riley et al. |
| 6,173,272 B1 | 1/2001 | Thomas et al. |
| 6,205,433 B1 | 3/2001 | Boesch et al. |
| 6,216,115 B1 | 4/2001 | Barrameda et al. |
| 6,243,689 B1 | 6/2001 | Norton |
| 6,246,999 B1 | 6/2001 | Riley et al. |
| 6,269,345 B1 | 7/2001 | Riboud |
| 6,304,860 B1 | 10/2001 | Martin, Jr. et al. |
| 6,317,745 B1 | 11/2001 | Thomas et al. |
| 6,408,284 B1 | 6/2002 | Hilt et al. |
| 6,598,028 B1 | 7/2003 | Sullivan et al. |
| 6,615,258 B1 | 9/2003 | Barry |
| 6,629,081 B1 | 9/2003 | Cornelius et al. |
| 6,721,715 B2 | 4/2004 | Nemzow |
| 6,754,640 B2 | 6/2004 | Bozeman |
| 6,829,590 B1 | 12/2004 | Greener et al. |
| 6,856,970 B1 | 2/2005 | Campbell et al. |
| 6,868,408 B1 | 3/2005 | Rosen |
| 6,873,972 B1 | 3/2005 | Marcial et al. |
| 6,892,184 B1 | 5/2005 | Komen |
| 7,004,382 B2 | 2/2006 | Sandru |
| 7,016,876 B1 | 3/2006 | Lanier et al. |
| 7,103,577 B2 | 9/2006 | Blair |
| 7,120,606 B1 | 10/2006 | Ranzini et al. |
| 7,269,575 B1 * | 9/2007 | Concannon et al. ............ 705/39 |
| 7,330,835 B2 | 2/2008 | Deggendorf |
| 7,333,953 B1 | 2/2008 | Banaugh et al. |
| 7,580,886 B1 | 8/2009 | Schulz |
| 2001/0034682 A1 | 10/2001 | Knight et al. |
| 2001/0034702 A1 | 10/2001 | Mockett et al. |
| 2002/0016769 A1 | 2/2002 | Barbara et al. |
| 2002/0029194 A1 | 3/2002 | Lewis et al. |
| 2002/0032642 A1 | 3/2002 | Chichilnisky |
| 2002/0035561 A1 | 3/2002 | Archer et al. |
| 2002/0038305 A1 | 3/2002 | Bahl et al. |
| 2002/0055904 A1 | 5/2002 | Mon |
| 2002/0072942 A1 | 6/2002 | Kuykendall et al. |
| 2002/0077971 A1 | 6/2002 | Allred |
| 2002/0082962 A1 | 6/2002 | Farris et al. |
| 2002/0087455 A1 | 7/2002 | Tsagarakis et al. |
| 2002/0099656 A1 | 7/2002 | Poh Wong |
| 2002/0120537 A1 | 8/2002 | Morea |
| 2002/0120846 A1 | 8/2002 | Stewart et al. |
| 2002/0161692 A1 | 10/2002 | Loh et al. |
| 2002/0161707 A1 | 10/2002 | Cole |
| 2002/0185529 A1 | 12/2002 | Cooper et al. |
| 2003/0018554 A1 | 1/2003 | Lyftogt et al. |
| 2003/0024979 A1 | 2/2003 | Hansen et al. |
| 2003/0033228 A1 | 2/2003 | Bosworth-Davies et al. |
| 2003/0050892 A1 | 3/2003 | Clynes |
| 2003/0055756 A1 | 3/2003 | Allan |
| 2003/0065594 A1 | 4/2003 | Murphy |
| 2003/0065941 A1 | 4/2003 | Ballard |
| 2003/0070080 A1 | 4/2003 | Rosen |
| 2003/0105710 A1 | 6/2003 | Barbara et al. |
| 2003/0126094 A1 | 7/2003 | Fisher et al. |
| 2003/0144942 A1 | 7/2003 | Sobek |
| 2003/0158811 A1 | 8/2003 | Sanders et al. |
| 2003/0167223 A1 | 9/2003 | Pledereder et al. |
| 2003/0167237 A1 | 9/2003 | Degen et al. |
| 2003/0177087 A1 | 9/2003 | Lawrence |
| 2003/0182227 A1 | 9/2003 | Guzman |
| 2003/0187783 A1 | 10/2003 | Arthus et al. |
| 2003/0187792 A1 | 10/2003 | Hansen et al. |
| 2003/0208439 A1 | 11/2003 | Rast |
| 2003/0208440 A1 | 11/2003 | Harada et al. |
| 2003/0208445 A1 | 11/2003 | Compiano |
| 2003/0220878 A1 | 11/2003 | Degen et al. |
| 2003/0229586 A1 | 12/2003 | Repak |
| 2003/0233319 A1 | 12/2003 | Lawrence |
| 2004/0002914 A1 | 1/2004 | Munro |
| 2004/0006533 A1 | 1/2004 | Lawrence |
| 2004/0024709 A1 | 2/2004 | Yu et al. |
| 2004/0030621 A1 | 2/2004 | Cobb |
| 2004/0034594 A1 | 2/2004 | Thomas et al. |
| 2004/0078328 A1 | 4/2004 | Talbert et al. |
| 2004/0078332 A1 | 4/2004 | Ferguson et al. |
| 2004/0083167 A1 | 4/2004 | Kight et al. |
| 2004/0093305 A1 | 5/2004 | Knight et al. |
| 2004/0109596 A1 | 6/2004 | Doran |
| 2004/0117299 A1 | 6/2004 | Algiene et al. |
| 2004/0128240 A1 | 7/2004 | Yusin |
| 2004/0138973 A1 | 7/2004 | Keis et al. |
| 2004/0143621 A1 | 7/2004 | Fredrickson et al. |
| 2004/0148255 A1 | 7/2004 | Beck et al. |
| 2004/0153403 A1 | 8/2004 | Sadre |
| 2004/0199463 A1 | 10/2004 | Deggendorf |
| 2004/0205011 A1 | 10/2004 | Northington et al. |
| 2004/0236646 A1 | 11/2004 | Wu et al. |
| 2005/0004872 A1 | 1/2005 | Gavin et al. |
| 2005/0021454 A1 | 1/2005 | Karpovich et al. |
| 2005/0038743 A1 | 2/2005 | Stanley et al. |
| 2005/0044043 A1 | 2/2005 | Gooding et al. |
| 2005/0086136 A1 | 4/2005 | Love et al. |
| 2005/0167481 A1 | 8/2005 | Hansen et al. |
| 2005/0177464 A1 | 8/2005 | Komen et al. |
| 2005/0209961 A1 | 9/2005 | Michelsen et al. |
| 2006/0206427 A1 | 9/2006 | Love |
| 2009/0157550 A1 | 6/2009 | Fraher et al. |

OTHER PUBLICATIONS

Lavery, Timothy A., "Cross-border payments hold promise for expediting international payroll", Mar. 1998, HRMagazine, vol. 43, Iss. 4.*

PremierEcorp, "ACH Editor User Guide, Version 1.1", Information Technology, Inc., 2001.*

Schageman, Frank, "International ACH is alternative to higher-costing wire transfers", Houston Business Journal, Jun. 4, 2004.*

U.S. Appl. No. 60/416,663, filed Oct. 7, 2002, Yusin.

Eurogiro, Development of Interface Between FED and Eurogiro, Request for Proposal, Jan. 14, 2003, Uwe Holmsgaard, Eurogiro Network A/S.

ACH Goes Across the Border, South Florida Banking Institute, Vicki Anderson, Retail Payments Office, Federal Reserve System, Oct. 29, 2001.

William B. Nelson, ACH News From Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH[SM] Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC) Product, Presented Feb. 15, 2002.

(56) References Cited

OTHER PUBLICATIONS

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Reguolations Governing the ACH Network, National Automated Clearing House Association, Copyright 2002. Attached pages: 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Assocation: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

PC AIMS User's Guide, Credit Controls, pp. 10-1 to 10-8, Feb. 25, 2002.

EPN Voice Response System (RALPH), Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

SEI Investments Utilizes CheckFree RECON Securities to Automate Reconciliation Processes PR Newswire, New York: Jun. 24, 2002; p. 1.

Bills, Steve; Clearing House Lets Depositories Share Fraud Data; American Banker; New York, N.Y.; Oct 12, 2001; vol. 167, Iss. 196; p. 9.

Kingston, Jennifer A.; TWI Players Retrenching, Visa Quits Processing; Dec. 3, 2002; American Banker; v167n230, p. 1.

Fed Extending ACH Services to 6 Nations; Mar. 7, 2003; American Banker; v168n45, p. 1.

McClelland, Kelly R.; International ACH: Best Kept Secret for Low Cost Payments; Mar./Apr. 2004; AFP Exchange; V24n2; pp. 44+.

Clearing House Lets Depositories Share Fraud Data Steve Bills. American Banker. New York, N.Y.: Oct. 12, 2001. vol. 167, Iss. 196; p. 9.

Homsgaard, Uwe, "Eurogiro, Development of Interface Between FED and Eurogiro", Request for Proposal, Jan. 14, 2003, Eurogiro Network A/S.

"Fixed-to-Fixed Foreign Exchange (F3x) Pilot Overview"; Dec. 18-19, 2006.

"Fixed-to-Fixed Foreign Exchange (F3x) Pilot Overview"; Oct. 25, 2007.

Abraham Silberschatz and Peter Galvin, Operating System Concepts, 1994, Addison-Wesley Publishing Company, Inc. 4$^{th}$ Edition, pp. 20-23.

Giles Brassard and Paul Bratley, Fundamentals of Algorithmics, 1996, Prentice-Hall Inc. pages 376-380.

Van Nana, D. & O'Brien, T., Flow of Saudis' Cash to Hamas is Scrutinized, NY Times, Sep. 17, 2003.

Fedline User Guide, ACH, Version 2.4, Mar. 2002 (pp. AH1-AH101).

Van Natta, D. & O'Brien, T., Flow of Saudis' Cash to Hamas is Scrutinized, NY Times, Sep. 17, 2003.

\* cited by examiner

MANAGING VARIABLE TO FIXED PAYMENTS IN AN INTERNATIONAL ACH

RELATED PATENT APPLICATION

The present patent application is a divisional patent application of U.S. patent application Ser. No. 11/224,380, entitled "Managing Foreign Payments in an International ACH," filed Sep. 12, 2005, now U.S. Pat. No. 7,580,886 which claims priority under 35 U.S.C. §119 to U.S. Provisional Patent Application No. 60/610,014, entitled "A Process for Managing Foreign Exchange in an International ACH," filed Sep. 15, 2004. Each of the foregoing priority applications is hereby fully incorporated herein by reference.

FIELD OF THE INVENTION

The invention relates generally to managing foreign payments in an International ACH, and more particularly to managing variable to fixed payments in an International ACH.

BACKGROUND OF THE INVENTION

Financial institutions are increasingly clearing financial transactions using electronic systems such as the Automated Clearinghouse ("ACH") network. The ACH network is a nationwide electronic funds transfer system supported by several operators, including the Federal Reserve Banks and other institutions. The ACH network is governed by a set of rules, which are administered by the National Automated Clearinghouse Association ("NACHA"). Financial institutions collect financial transactions and package them in batched ACH files, according to the NACHA rules, for forwarding to other institutions. Typically, the financial transactions are bundled as ACH items in a single ACH file before being transmitting over the ACH network.

The terms "financial transaction," "transaction," "ACH item," and "item" are used interchangeably herein to refer to any batched processed electronic payment or payment instruction, whether international or domestic. A "financial transaction" can also include information associated with a batched processed electronic payment or payment instruction. A payment or payment instruction therefor can be e.g., a credit, a debit, or a rejected or returned transaction. The terms "ACH file," "electronic file," and "file" are used interchangeably herein to refer to any collection of batched and/or unbatched ACH items. The term "financial institution" is generally used herein to refer to any person or entity that processes, creates, transmits, or receives data associated with a financial transaction.

The ACH network is being expanded for use with financial institutions in other countries. An International ACH links the ACH network to an ACH or comparable payment system in countries outside the U.S. An originating depository financial institution ("ODFI") can forward ACH files through a U.S. gateway operator ("USGO") and further through a foreign receiving gateway operator ("FRGO") in the country of the receiving depository financial institution ("RDFI"). The term "gateway operator" is generally used herein to refer to a financial institution that serves as a central clearing facility through which other financial institutions transmit or receive ACH items and/or ACH files. The FRGO passes the ACH files into its domestic ACH, performing any necessary reformatting of the ACH files.

Settlement is effected two times, the first by the USGO, which settles between the ODFI and the FRGO, and the second by the FRGO, which settles good funds to or from an account of the RDFI. In general, ACH systems permit origination and settlement in the originating and receiving countries' domestic currencies. In an international transaction where the originating and receiving countries employ different currencies, a foreign exchange ("FX") conversion must take place.

Traditionally, the International ACH has only accommodated fixed to variable ("FV") payments. In FV credit payments, a fixed amount of domestic currency is converted into whatever amount of the destination currency can be purchased when the FRGO receives the ACH file, usually the banking day after the ODFI creates the ACH item. The term "create" is generally used herein to refer to generating a properly formatted ACH item, e.g., from information received by the ODFI from a customer. Until the FRGO processes the ACH item—one or more banking days after item creation—the ODFI is unaware of the precise amount of foreign currency that will be credited to the RDFI. In an FV debit payment, an ODFI requests a particular amount of domestic currency from an RDFI, but, e.g., due to an FX conversion rate change during processing, the ODFI may not receive the requested amount.

Business contracts often require ODFIs to transmit specified, fixed amounts of foreign currency to RDFIs. Business contracts also often require ODFIs to receive from RDFIs specified, fixed amounts of domestic currency. Thus, a need exists in the art for a system and method of managing foreign credit payments in an International ACH, whereby ODFIs can specify pre-determined foreign currency payment amounts. In addition, a need exists in the art for a system and method for managing foreign debit payments in an International ACH, whereby ODFIs can specify pre-determined domestic currency payment amounts.

SUMMARY OF THE INVENTION

The invention satisfies the above-described and other needs by providing systems and methods for managing foreign payments in an International ACH. Specifically, the invention allows financial institutions to manage credit payments of a fixed amount of foreign currency in the International ACH. An ODFI can create an ACH item designating a fixed amount of foreign currency to be credited to an RDFI. Thus, upon creation of the ACH item, the ODFI can be aware of the precise amount of foreign currency to be credited to the RDFI. The invention also allows financial institutions to manage debit payments of a fixed amount of domestic currency in an International ACH. An ODFI can create an ACH item designating a fixed amount of domestic currency to be credited to the ODFI from an RDFI. Thus, upon creation of the ACH item, the ODFI can be aware of the precise amount of domestic currency to be credited to it.

In one aspect of the invention, the ODFI can create a variable to fixed credit payment. In a variable to fixed credit payment, the ODFI designates a fixed amount of foreign currency to be credited to the RDFI. The ODFI and/or the USGO can use an FX conversion rate to determine an amount of domestic currency that is equivalent to the designated amount of foreign currency. The FX conversion rate is the rate at which one currency, e.g., the foreign currency, can be converted into another currency, e.g., the domestic currency. The ODFI can create an ACH item designating the payment amount in the foreign currency. A conversion module of the ODFI can interact with an FX Agent to determine the FX conversion rate for the foreign currency. The term "FX Agent" is generally used herein to refer to any person, entity, and/or software module that can assist a financial institution in processing foreign payments, e.g., by providing and/or guaranteeing for a specified time period one or more FX conversion rates. The FX Agent can guarantee the FX conversion rate for one or more banking days.

Based on the FX conversion rate, the conversion module can calculate an amount of domestic currency equivalent to the foreign currency payment amount. The conversion module can enter that domestic currency amount and/or the FX conversion rate into the ACH item. Alternatively, the ODFI can allow the USGO to instead determine the FX conversion rate, calculate the equivalent domestic currency amount, and enter the FX conversion rate and/or the equivalent domestic currency amount into the ACH item. If so allowed, the USGO can locally or remotely access the conversion module. The ODFI can transmit the ACH item to an ACH network for processing. In transmitting the ACH item, the ODFI can collect at least the ACH item into an ACH file and transmit the ACH file to the ACH network. The ACH file can be in the NACHA file format.

A first gateway operator, which can be the USGO, can receive the ACH item from the ACH network. If the ACH item includes only the FX conversion rate, and not the domestic currency amount, the USGO can calculate the domestic currency amount from the FX conversion rate. To help effect payment of the foreign currency amount, the USGO can settle between the ODFI and the FX Agent by debiting an account of the ODFI and crediting an account of the FX Agent. Each of the credit and the debit can be in domestic currency. The credit can comprise the calculated amount of domestic currency. Similarly, the debit can comprise the calculated amount of domestic currency. The USGO can transmit the ACH item to a second gateway operator, which can be the FRGO. The FRGO can be located in the same country as the RDFI. The FRGO can settle between the FX Agent and the RDFI by debiting an account of the FX Agent and crediting an account of the RDFI. Each of the credit and the debit can be in foreign currency. The credit can comprise the foreign currency payment amount designated in the ACH item. Similarly, the debit can comprise the foreign currency payment amount designated in the ACH item.

In another aspect of the invention, the ODFI can create a fixed to fixed credit payment. In a fixed to fixed credit payment, payment of a fixed amount of foreign currency occurs without any FX conversion. The ODFI can create at least one ACH item designating, in a foreign currency, a payment amount to be credited to an RDFI. The RDFI can be located in a foreign country. The ODFI can transmit the ACH item to a first gateway operator, e.g., the USGO, via the ACH network. In transmitting the ACH item, the ODFI can collect at least the ACH item in an ACH file in the NACHA format. The USGO can transmit the ACH item to a second gateway operator, e.g., the FRGO. The FRGO can be located in the same country as the RDFI. The USGO can calculate a settlement amount comprising the amount of money, in foreign currency, needed to settle between the ODFI and the FRGO. For example, the USGO can aggregate the total payment amount of each ACH item to determine the settlement amount. The USGO can transmit a notification of the settlement amount to the ODFI. Based on that notification, the ODFI can transmit foreign currency funds to the FRGO via ACH or non-ACH means. The FRGO can transmit the funds, in foreign currency, to the RDFI.

In another aspect of the invention, the ODFI can create a variable to fixed debit payment. In a variable to fixed debit payment, the ODFI designates a fixed amount of domestic currency to be credited to the ODFI. The ODFI and/or the USGO can use an FX conversion rate to determine an amount of foreign currency that is equivalent to the designated amount of domestic currency.

The ODFI can create an ACH item designating the payment amount in the domestic currency. A conversion module of the ODFI can interact with an FX Agent to determine the FX conversion rate for the domestic currency. The FX Agent can guarantee the FX conversion rate for one or more banking days. Based on the FX conversion rate, the conversion module can calculate an amount of foreign currency equivalent to the domestic currency payment amount. The conversion module can enter that foreign currency amount and/or the FX conversion rate into the ACH item. Alternatively, the ODFI can allow the USGO to instead determine the FX conversion rate, calculate the equivalent foreign currency amount, and enter the FX conversion rate and/or the equivalent foreign currency amount into the ACH item. If so allowed, the USGO can locally or remotely access the conversion module. The ODFI can transmit the ACH item to an ACH network for processing. In transmitting the ACH item, the ODFI can collect at least the ACH item into an ACH file and transmit the ACH file to the ACH network. The ACH file can be in the NACHA file format.

A first gateway operator, which can be the USGO, can receive the ACH item from the ACH network. If the ACH item includes only the FX conversion rate, and not the foreign currency amount, the USGO can calculate the foreign currency amount from the FX conversion rate. To help effect payment of the domestic currency amount, the USGO can settle between the ODFI and the FX Agent by debiting an account of the FX Agent and crediting an account of the ODFI. Each of the credit and the debit can be in domestic currency. The credit can comprise the domestic currency payment amount. Similarly, the debit can comprise the domestic currency payment amount. The USGO can transmit the ACH item to a second gateway operator, which can be the FRGO. The FRGO can be located in the same country as the RDFI. The FRGO can settle between the FX Agent and the RDFI by debiting an account of the RDFI and crediting an account of the FX Agent. Each of the credit and the debit can be in foreign currency. The credit can comprise the calculated foreign currency amount. Similarly, the debit can comprise the calculated foreign currency amount.

In another aspect of the invention, the ODFI can create a fixed to fixed debit payment. In a fixed to fixed debit payment, payment of a fixed amount of foreign currency occurs without any FX conversion. The ODFI can create at least one ACH item designating, in a foreign currency, a payment amount to be credited to the ODFI from an RDFI. The RDFI can be located in a foreign country. The ODFI can transmit the ACH item to a first gateway operator, e.g., the USGO, via the ACH network. In transmitting the ACH item, the ODFI can collect at least the ACH item in an ACH file in the NACHA format. The USGO can transmit the ACH item to a second gateway operator, e.g., the FRGO. The FRGO can be located in the same country as the RDFI. The USGO can calculate a credit amount comprising the amount of money, in foreign currency, needed to settle between the RDFI and the ODFI. For example, the USGO can aggregate the total payment amount of each ACH item to determine the credit amount. The USGO can transmit a notification of the credit amount to the ODFI. The FRGO can receive the ACH item(s) and help to settle between the RDFI and the ODFI by debiting an account of the RDFI and crediting an account of the ODFI, e.g., in an ODFI correspondent bank. The amounts of the debit and the credit can comprise the foreign currency payment amount.

In yet another aspect of the invention, each variable to fixed credit payment, variable to fixed debit payment, fixed to fixed credit payment, and fixed to fixed debit payment can be a return payment. In other words, each ACH item can not be processed, e.g., due to a closed RDFI bank account or a lack of sufficient funds, and can be returned, through the International ACH, back to the ODFI. For example, a variable to fixed credit payment can be returned from an RDFI to a first gateway operator, e.g., the USGO, via a second gateway operator, e.g., the FRGO. The ACH item designates, in foreign currency, a payment amount that was transmitted to the RDFI from the ODFI. To help effect the return of the funds transmitted to the RDFI, the FRGO can credit an account of an FX Agent and debit an account of the RDFI. The credit and the debit can be in foreign currency. Each of the debit and the credit can comprise the foreign currency payment amount.

Upon receipt of the ACH item, the USGO can interact with the FX agent to determine an FX conversion rate for the foreign currency. Based on the FX conversion rate, the USGO can calculate an amount of domestic currency then equivalent to the foreign currency payment amount. The USGO can enter the FX conversion rate and/or the calculated domestic currency amount into the ACH item. The USGO can transmit the ACH item to the ODFI. To help effect the return of the funds transmitted from the ODFI, the USGO can debit an account of the FX Agent and credit an account of the ODFI. The credit and debit can be in domestic currency. The amount of the debit can comprise the calculated amount of domestic currency. Similarly, the amount of the credit can comprise the calculated amount of domestic currency.

Additional aspects, features, and advantages of the invention will become apparent to those skilled in the art upon consideration of the following detailed description of illustrated embodiments exemplifying the best mode of carrying out the invention as presently perceived.

DETAILED DESCRIPTION OF EXEMPLARY EMBODIMENTS

Figure 1:
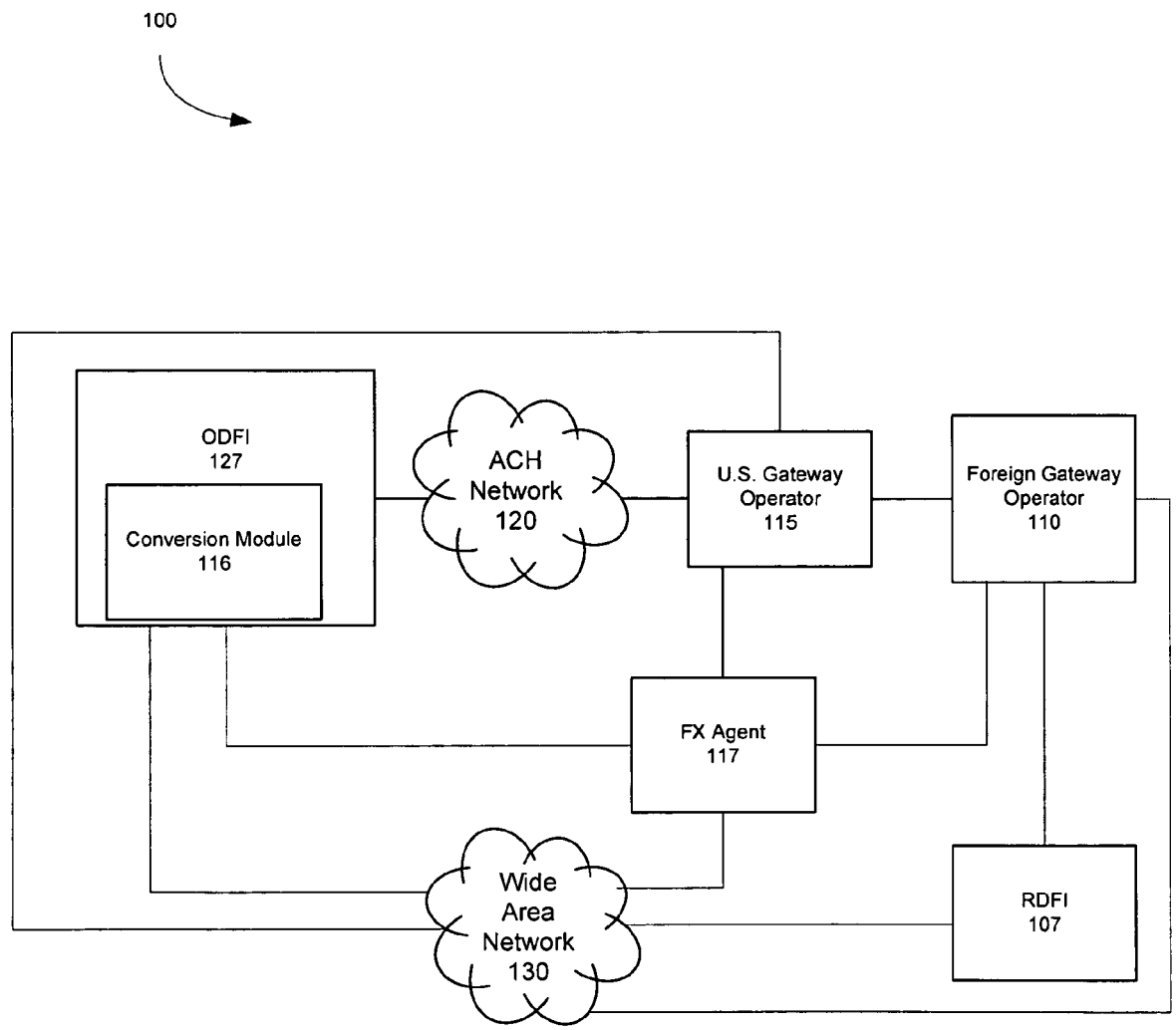
FIG. 1 is a block diagram illustrating an exemplary system for managing variable to fixed payments in an International ACH, according to an exemplary embodiment of the invention.

The invention is directed to systems and methods for managing foreign payments in an International ACH. In particular, the invention is directed to managing variable to fixed and fixed to fixed payments. In a variable to fixed credit payment, an ODFI designates a fixed amount of foreign currency to be credited to an RDFI. The ODFI and/or a USGO can use an FX conversion rate to calculate an amount of domestic currency that is equivalent to the designated amount of foreign currency. In a variable to fixed debit payment, an ODFI designates a fixed amount of domestic currency to be credited to the ODFI. The ODFI and/or a USGO can use and FX conversion rate to calculate an amount of foreign currency that is equivalent to the designated amount of domestic currency. In a fixed to fixed payment, payment of a designated, fixed amount of foreign currency occurs without any FX conversion occurring within the ACH process.

The invention can be implemented in a variety of embodiments. In one exemplary embodiment, on a first banking day, an ODFI can create at least one ACH item for payment of a fixed amount of foreign currency to an account of an RDFI. The ODFI can interact with one or more FX Agents to determine an FX conversion rate for each ACH item. The term "FX Agent" is generally used herein to refer to any person, entity, and/or software module that can assist a financial institution in processing foreign payments, e.g., by providing and/or guaranteeing for a specified time period one or more FX conversion rates. The FX conversion rate is the rate at which one currency, e.g., the foreign currency, can be converted into another currency, e.g., the domestic currency. The FX Agent can guarantee the FX conversion rate for one or more banking days.

Based on the FX conversion rate, the ODFI can calculate the amount of domestic currency needed for the amount of foreign currency the ODFI desires to transmit. The ODFI can enter the calculated amount of domestic currency and/or the FX conversion rate into an appropriate field of the ACH item. The ODFI can package a group of batched and/or unbatched ACH items in an ACH file and transmit the ACH file to the USGO for processing. The USGO can transmit the ACH file to the FRGO, which can receive the ACH file on a second banking day. The FRGO can obtain the foreign currency from the FX Agent and transmit the desired amount of the foreign currency to the RDFI on either the second or a third banking day.

By allowing the ODFI to interact with the FX Agent to determine a guaranteed FX conversion rate that the ODFI can enter into the ACH item, the invention allows the ODFI to limit risk associated with the delayed processing times of the International ACH. The ODFI can fix the FX conversion rate with the FX Agent upon creation of the ACH item, one or more banking days before payment settlement. Thus, the ODFI can determine, and maintain accurate accounting and other records based on, the actual domestic currency cost of the payment upon creation of the ACH item.

In a second exemplary embodiment, the ODFI can create the ACH item without itself determining, or entering into the ACH item, the FX conversion rate or the amount of domestic currency corresponding to the desired amount of foreign currency. Instead, it can transmit the ACH item specifying the desired foreign currency amount to the USGO, which can determine, and/or enter into the ACH item, the FX conversion rate and/or the corresponding domestic currency amount.

In a third exemplary embodiment, neither the ODFI nor the USGO must enter either the FX conversion rate or the corresponding amount of domestic currency into the ACH item at the time of creation or subsequent processing. Rather, the ODFI can utilize the International ACH network to transmit information about the foreign currency payment to the USGO, the FRGO, and the RDFI. The ODFI can settle the payment via ACH or non-ACH means, such as a wire payment or a payment instruction to a foreign financial institution.

In a fourth exemplary embodiment, on a first banking day, an ODFI can create at least one ACH item designating a fixed amount of domestic currency to be credited to the ODFI from an RDFI. The ODFI can interact with one or more FX Agents to determine an FX conversion rate for each ACH item. The FX Agent can guarantee the FX conversion rate for one or more banking days. Based on the FX conversion rate, the ODFI can calculate the amount of foreign currency that is equivalent to the designated amount of domestic currency in the ACH item. The ODFI can enter the calculated amount of foreign currency and/or the FX conversion rate into an appropriate field of the ACH item. The ODFI can package a group of batched and/or unbatched ACH items in an ACH file and transmit the ACH file to the USGO for processing. The USGO can obtain the domestic currency from the FX Agent and transmit the desired amount of domestic currency to the ODFI on the first or a second banking day. The USGO can transmit the ACH file to the FRGO, which can receive the ACH file on the second banking day. On the second or a third banking day, the FRGO can debit the RDFI and credit the FX Agent, in foreign currency. The amounts of the debit to the RDFI and the credit to the FX Agent can equal the calculated amount of foreign currency in the ACH item.

In a fifth exemplary embodiment, the ODFI can create the ACH item without itself determining, or entering into the ACH item, the FX conversion rate or the amount of foreign currency corresponding to the desired amount of domestic currency. Instead, it can transmit the ACH item specifying the desired domestic currency amount to the USGO, which can determine, and/or enter into the ACH item, the FX conversion rate and/or the corresponding foreign currency amount. In a sixth exemplary embodiment, neither the ODFI nor the USGO must enter either the FX conversion rate or the corresponding amount of foreign currency into the ACH item at the time of creation or subsequent processing. Rather, the ODFI can utilize the International ACH network to transmit information about the domestic currency payment to the USGO, the FRGO, and the RDFI. The payment can be settled via ACH or non-ACH means.

Turning now to the drawings, in which like numerals indicate like elements throughout the several figures, exemplary embodiments of the invention are described in detail.

FIG. 1 is a block diagram illustrating an exemplary system 100 for managing variable to fixed payments in an International ACH, according to an exemplary embodiment of the invention. The exemplary system 100 comprises various financial institutions and computer systems involved in processing an international financial transaction. An ODFI 127 can create a financial transaction and forward the financial transaction through an ACH network 120, a USGO 115, and an FRGO 110, to an RDFI 107.

The ODFI 127 can create one or more ACH items on a first banking day. In so doing, for credit payments, the ODFI 127 can enter into each ACH item a desired amount of foreign currency to be credited to the RDFI 107.

For each ACH item, a conversion module 116 of the ODFI 127 can interact with an FX Agent 117 to determine an FX conversion rate. As stated above, the FX Agent 117 can be any person, entity, and/or software module that can assist a financial institution in processing foreign payments, e.g., by providing and/or guaranteeing for a specified time period one or more FX conversion rates. For example, the FX Agent 117 can comprise a network based application module, such as a website. The FX conversion rate is the rate at which one currency, e.g., the foreign currency, can be converted into another currency, e.g., the domestic currency.

Based on the FX conversion rate the conversion module 116 can determine the amount of domestic currency needed for the amount of foreign currency desired. The ODFI 127 can use the conversion module 116 to enter that domestic currency amount into the ACH item. Alternatively, the ODFI 127 can use the conversion module 116 to enter the FX conversion rate, either alone or in conjunction with the domestic currency amount, into the ACH item. In an alternative embodiment of the invention described in greater detail below, in conjunction with FIG. 2, the USGO 115 can remotely or locally access the conversion module 116 to determine, and/or enter into the ACH item, the domestic currency amount and/or the FX conversion rate.

Figure 7:
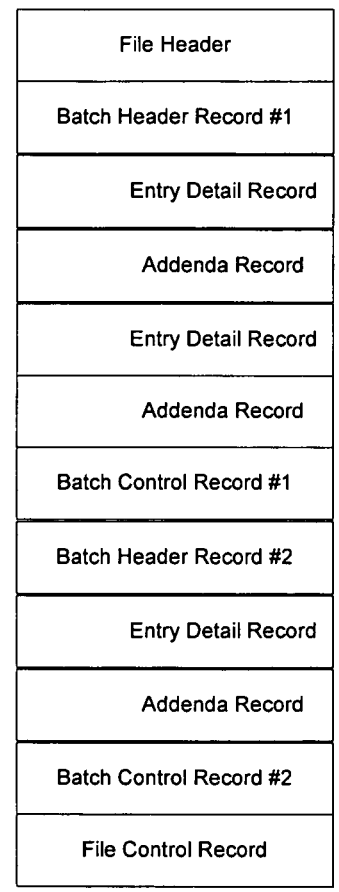
FIG. 7 is a block diagram illustrating an ACH file structure in accordance with an exemplary embodiment of the invention.

The ODFI 127 can collect one or more of the ACH items, bundled or unbundled, into at least one ACH file. Typically, an ACH file is in the NACHA file format. The fields that generally constitute a NACHA-formatted ACH file are illustrated in the exemplary file structure in FIG. 7. Other suitable file formats and file fields will be apparent to those of skill in the art. The ODFI 127 can transmit the ACH file(s) to the ACH network 120. The ACH network 120 can unbundle from the ACH file(s) the cross-border ACH items. The ACH network 120 can transmit the cross-border ACH items to the USGO 115 for processing. Based on the location of the RDFI 107, the USGO 115 can determine an appropriate FRGO 110 through which it can transmit each ACH item. For example, if the RDFI 107 is located in Japan, the USGO 115 can determine to transmit the ACH item to a Japanese FRGO 110. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110.

The USGO 115 can collect one or more ACH items destined for the same FRGO 110 into at least one new ACH file. The USGO 115 can transmit each new ACH file to its corresponding FRGO 110. In one embodiment of the invention, the USGO 115 can convert the ACH file from a format used in the U.S., such as the NACHA format, to a format used in the country of the FRGO 110, prior to transmitting the file to the FRGO 110. Certain exemplary methods and systems for conducting such a file format conversion are described in co-pending U.S. patent application Ser. No. 10/868,729, which is incorporated herein by reference in its entirety.

On a second banking day, for each ACH item, the USGO 115 can debit the account of the ODFI 127 and credit the account of the FX Agent 117, in domestic currency. The amount of the debit can equal the amount of the credit, which can equal the domestic currency amount designated in the ACH item. In one embodiment of the invention, the amounts of the debit, the credit, and/or the designated domestic currency can vary, e.g., to account for processing fees and/or commissions. The FX Agent 117 can credit the account of the FRGO 110 in foreign currency. The amount of the credit can equal the foreign currency amount designated in the ACH item. In one embodiment of the invention, the amounts of the credit and the designated foreign currency amount can vary, e.g., to account for processing fees and/or commissions.

When the FRGO 110 receives the ACH file on the second banking day, it can unbundle each ACH item and determine, for each ACH item, the RDFI 107 for which the ACH item is destined. On the second or a third banking day, the FRGO 110 can credit the account of each RDFI 107 in foreign currency. The credit amount can equal the amount credited to the FRGO 110 by the FX Agent 117 for the ACH item, which can equal the foreign currency amount designated in the ACH item. In one embodiment of the invention, the amounts of the credit to the RDFI 107, the credit to the FRGO 110, and/or the designated foreign currency amount can vary, e.g., to account for processing fees and/or commissions. The FRGO 110 can collect ACH items destined for the same RDFI 107 in at least one new ACH file and transmit the ACH file(s) to the RDFI 107.

Those skilled in the art will appreciate that exemplary system 100 is merely representative of the components for managing variable to fixed payments in an International ACH. Other embodiments of the invention may not have all of the components identified in FIG. 1 or can include other components.

Figure 2:
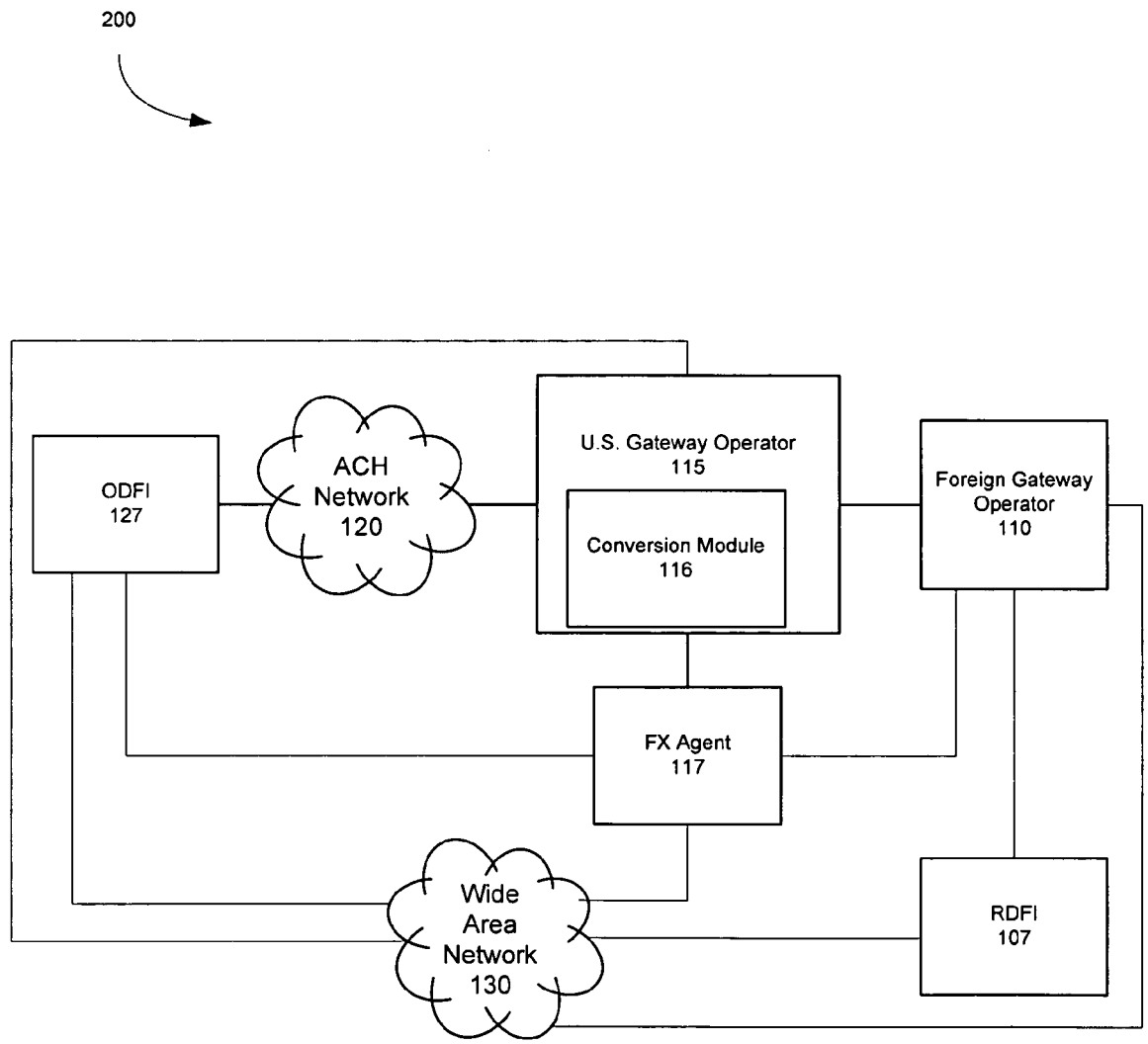
FIG. 2 is a block diagram illustrating an alternative exemplary system for managing variable to fixed payments in an International ACH, according to an exemplary embodiment of the invention.

FIG. 2 illustrates an alternative exemplary system 200 for managing variable to fixed payments in an International ACH, according to an exemplary embodiment of the invention. As in FIG. 1, the alternative exemplary system 100 comprises various financial institutions and computer systems involved in processing an international financial transaction.

The USGO 115 comprises a conversion module 116 operable for interacting with the FX Agent 117. Via the ACH network 120, the USGO 115 can receive from the ODFI 127 one or more cross-border ACH items. The ACH items can designate an amount of foreign currency to be credited to the RDFI 107. Through the conversion module 116, the USGO 115 can determine the FX conversion rate for each ACH item. Based on that FX conversion rate, the conversion module 116 can determine the amount of domestic currency corresponding to the foreign currency amount designated in each ACH item. The USGO 115 can use the conversion module 116 to enter the domestic currency amount into the ACH item. In one embodiment of the invention, the USGO 115 can also use the conversion module 116 to enter the FX conversion rate into the ACH item. In another embodiment, the USGO 115 can obtain the FX conversion rate, notify the ODFI 127 of the FX conversion rate, and proceed with the transaction or pend or return the ACH item to the ODFI 127 as instructed.

Those skilled in the art will appreciate that alternative exemplary system 200 is merely representative of the components for managing variable to fixed payments in an International ACH. Other embodiments of the invention may not have all of the components identified in FIG. 2 or can include other components.

Figure 3:
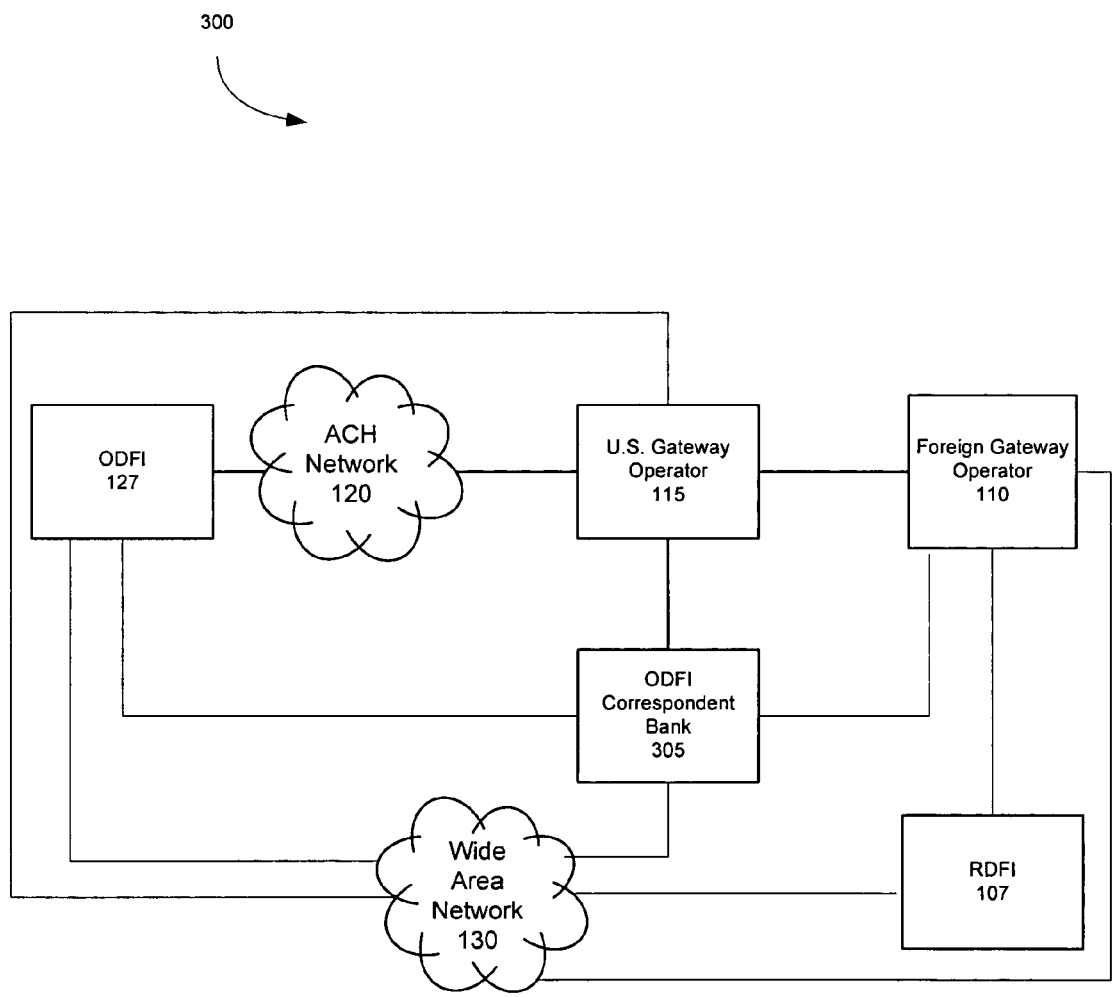
FIG. 3 is a block diagram illustrating an exemplary system for managing fixed to fixed payments in an International ACH, according to an exemplary embodiment of the invention.

FIG. 3 is a block diagram illustrating an exemplary system 300 for managing fixed to fixed payments in an International ACH, according to an exemplary embodiment of the invention. As in FIGS. 1 and 2, the exemplary system 300 comprises various financial institutions and computer systems involved in processing an international financial transaction.

The ODFI 127 can create one or more ACH items. In so doing, the ODFI 127 can insert into each ACH item a designated amount of foreign currency to be credited to the RDFI 107. The ODFI 127 can collect one or more of the ACH items in at least one ACH file. The ODFI 127 can transmit the ACH file(s) through the ACH network 120, the USGO 115, and the FRGO 110 to the RDFI 107.

Specifically, the ODFI 127 can transmit the ACH file(s) to the ACH network 120. The ACH network 120 can unbundle from the ACH file(s) the cross-border ACH items. The ACH network 120 can transmit the cross-border ACH items to the USGO 115 for processing. Based on the location of the RDFI 107, the USGO 115 can determine the appropriate FRGO 110 through which it can transmit each ACH item. For example, if the RDFI 107 is located in Japan, the USGO 115 can determine to transmit the ACH item to a Japanese FRGO 110. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110.

For each FRGO 110, the USGO 115 can aggregate the foreign currency amounts designated in the ACH items to determine a total amount of foreign currency needed from the ODFI 127 to settle to the FRGO 110. Via the wide area network 130 or the ACH network 120, for example, the USGO 115 can transmit to the ODFI 127 a notification comprising the total foreign currency amount needed to settle with each FRGO 110. The notification can include a list of each FRGO 110 along with the foreign currency amount needed to settle with each FRGO 110. Alternatively, the USGO 115 can transmit multiple notifications to the ODFI 127, each notification comprising the total foreign currency amount needed for a particular FRGO 110. Each notification can include information about a single FRGO 110.

Upon receipt of the notification(s) from the USGO 115, the ODFI 127 can settle to the FRGO 110, for example, by using an ODFI correspondent bank 305 in the same country as the FRGO 110. The ODFI correspondent bank 305 can comprise any financial institution that can assist the ODFI 127 in transmitting foreign currency funds to the FRGO 110 and/or another foreign entity. For example, the ODFI correspondent bank 305 can comprise an FX Agent or a branch office or other agent of the ODFI 127. The ODFI 127 can instruct the ODFI correspondent bank 305 to credit the FRGO 110 in foreign currency. The amount of the credit can equal the amount designated in the notification(s) from the USGO 115. In one embodiment of the invention, the amounts of the credit to the FRGO 110 and the amount designated in the notification(s) from the USGO 115 can vary, e.g., to account for processing fees and/or commissions.

In an alternative embodiment of the invention, the ODFI 127 can itself transmit the foreign currency to the FRGO 110, e.g., via a wire payment. In yet another alternative embodiment of the invention, a party other than the ODFI 127 can initiate the transfer of funds from the ODFI 127 to the FRGO 110.

The FRGO 110 can collect ACH items destined for the same RDFI 107 into at least one new ACH file and transmit the ACH file(s) to the RDFI 107. The FRGO 110 can credit the account of each RDFI 107 in foreign currency. The credit amount can equal the amount credited to the FRGO 110 by the ODFI correspondent bank 305 for the ACH item, which can equal the foreign currency amount designated in the ACH item. In one embodiment of the invention, the amounts of the credit to each RDFI 107, the credit to the FRGO 110, and/or the designated foreign currency can vary, e.g., to account for processing fees and/or commissions.

Those skilled in the art will appreciate that alternative exemplary system 300 is merely representative of the components for managing variable to fixed payments in an International ACH. Other embodiments of the invention may not have all of the components identified in FIG. 3 or can include other components.

Figure 4:
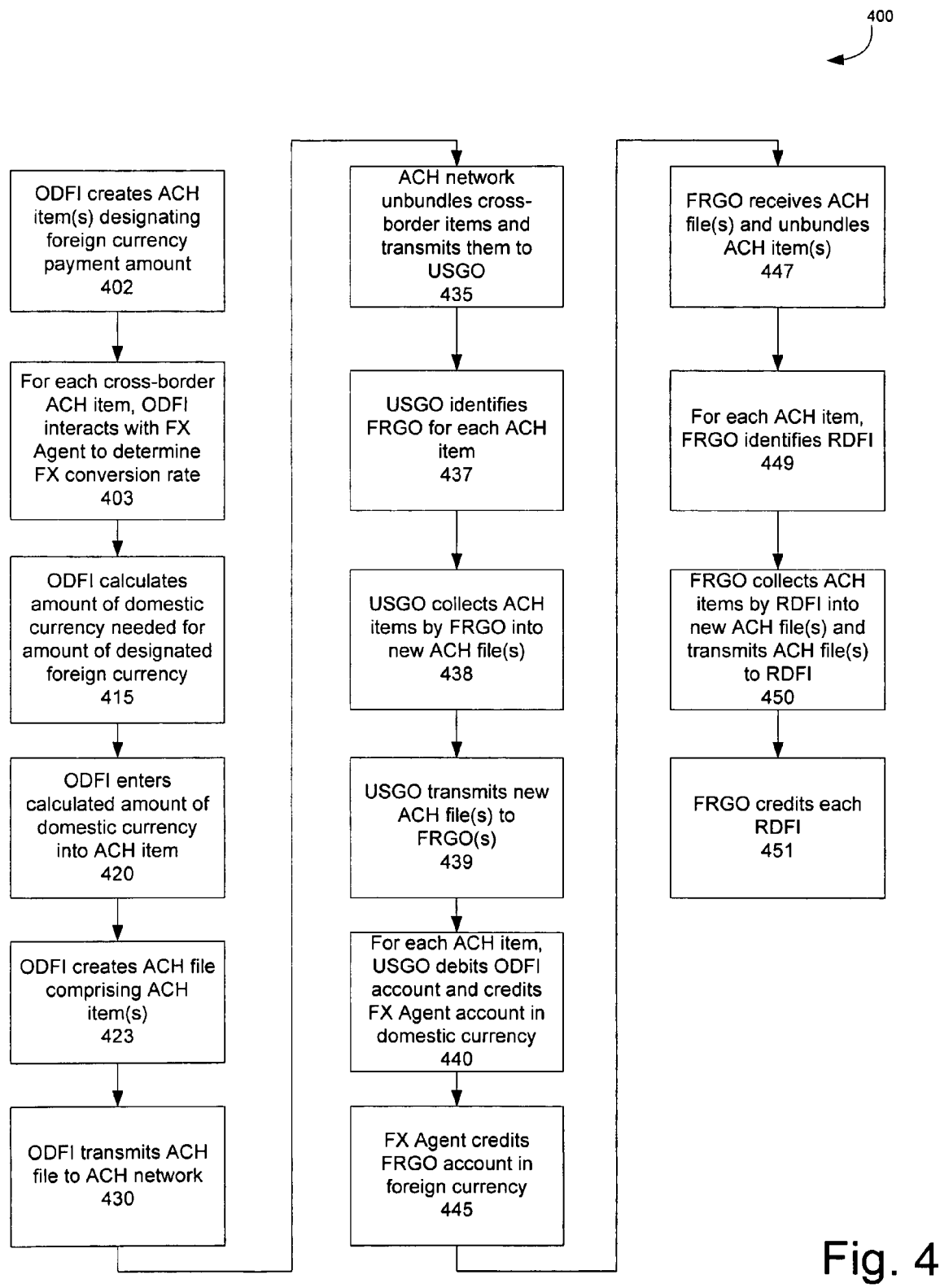
FIG. 4 is a flow chart diagram illustrating a method for managing variable to fixed credit payments in an International ACH, according to an exemplary embodiment of the invention.

FIG. 4 is a flow chart diagram illustrating a method 400 for managing variable to fixed credit payments in an International ACH, according to an exemplary embodiment of the invention. The exemplary method 400 is merely illustrative and, in alternative embodiments of the invention, certain steps can be performed in a different order, in parallel with one another, certain steps can be omitted entirely, and/or certain additional steps can be performed.

In step 402, the ODFI 127 creates one or more ACH items on a first banking day. In so doing, the ODFI 127 inserts into each ACH item a designated amount of foreign currency to be credited to the RDFI 107. For each cross-border ACH item, the conversion module 116 of the ODFI 127 interacts with the FX Agent 117 to determine the FX conversion rate, in step 403. In step 415, the conversion module 116 calculates, based on the FX conversion rate determined in step 403, the amount of domestic currency needed for the amount of designated foreign currency. In step 420, the conversion module 116 enters the calculated amount of domestic currency into an appropriate field of the ACH item. Alternatively, the conversion module 116 can enter the FX conversion rate, either alone or in conjunction with the domestic currency amount, into the ACH item.

In step 423, the ODFI 127 collects the ACH item(s), bundled or unbundled, in at least one ACH file. In step 430, the ODFI 127 transmits the ACH file(s) comprising the ACH items to the ACH network 120. The ACH network 120 unbundles the cross-border ACH items from the ACH file and transmits them to the USGO 115 in step 435. In step 437, the USGO 115 identifies, for each cross-border ACH item, the FRGO 110 through which the USGO 115 will transmit the ACH item, to the RDFI 107. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110. In step 438, the USGO 115 collects ACH items destined for the same FRGO 110 into at least one new ACH file. Thus, for each FRGO 110 determined in step 437, the USGO 115 creates at least one ACH file. In step 439, the USGO 115 transmits each ACH file to its corresponding FRGO 110. Although not illustrated in exemplary process 400, the transmission of the ACH file from the USGO 115 to the FRGO 110 typically involves a conversion process from one file format to another file format.

In step 440, for each ACH item, the USGO 115 debits the account of the ODFI 127 and credits the account of the FX Agent 117. The debit and credit are in domestic currency. The amount of the debit can equal the amount of the credit, which can equal the domestic currency amount determined in step 415. In one embodiment of the invention, the amounts of the debit and the credit can vary, e.g., to account for processing fees and/or commissions. In step 445, the FX Agent 117 credits the account of the FRGO 110 in foreign currency. The amount of the credit can equal the foreign currency amount designated in the ACH item. In one embodiment of the invention, the amounts of the credit and the foreign currency can vary, e.g., to account for processing fees and/or commissions.

In step 447, the FRGO 110 receives the ACH file and unbundles each ACH item from the ACH file. In step 449, the FRGO 110 identifies, for each ACH item, the RDFI 107 for which the ACH item is destined. In step 450, the FRGO 110 collects ACH items destined for the same RDFI 107 into at least one new ACH file and transmits the ACH file(s) to the RDFI 107. Thus, for each RDFI 107 determined in step 449, the FRGO 110 creates and transmits at least one new ACH file. In step 451, the FRGO 110 credits the account of each RDFI 107. The credit amount can equal the amount credited to the FRGO 110 in step 445 for that item. In one embodiment of the invention, the amounts of the credit to each RDFI 107 and the credit to the FRGO 110 can vary, e.g., to account for processing fees and/or commissions.

Figure 5:
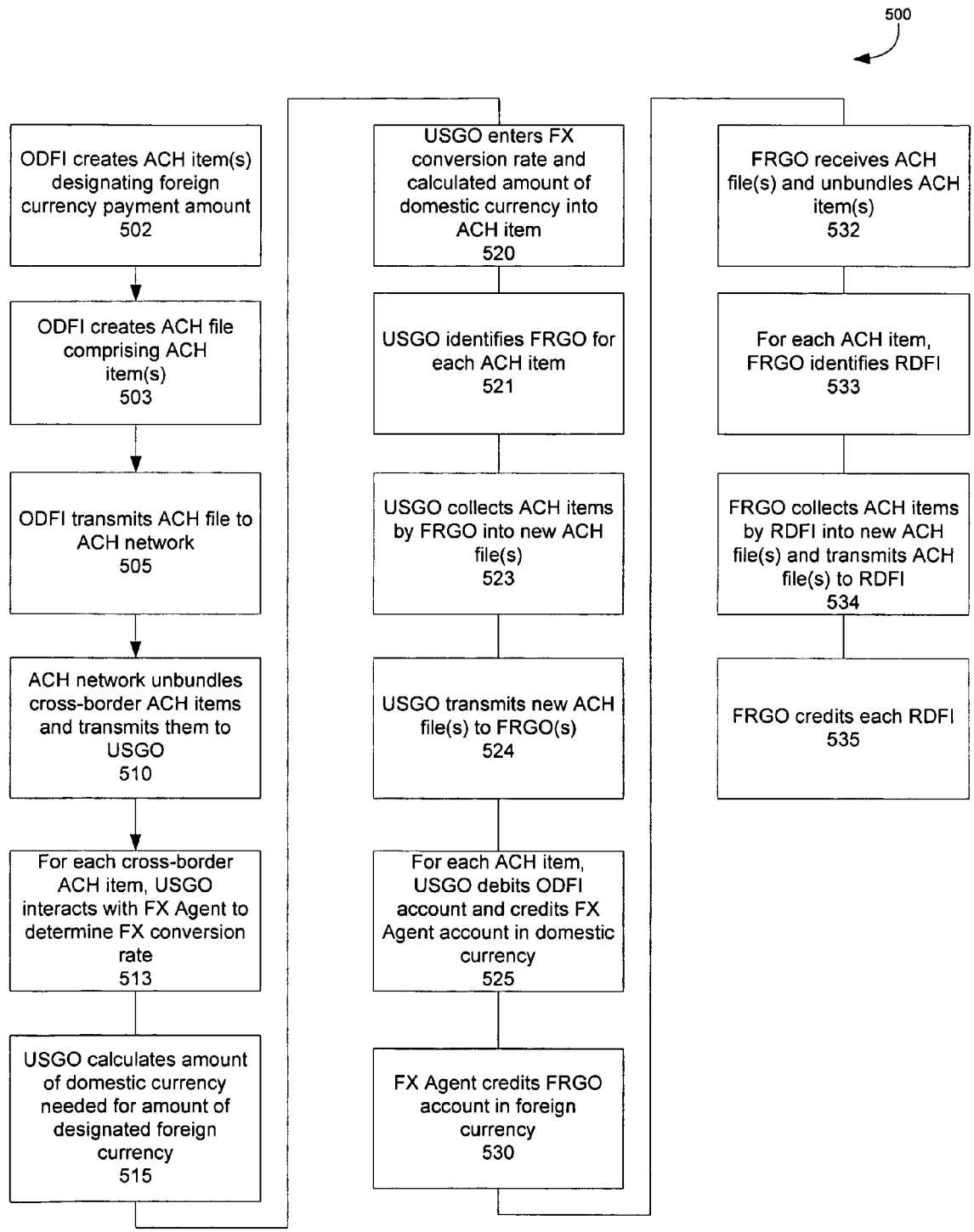
FIG. 5 is a flow chart diagram illustrating a method for managing variable to fixed credit payments in an International ACH, according to an alternative exemplary embodiment of the invention.

FIG. 5 is a flow chart diagram illustrating a method 500 for managing variable to fixed credit payments in an International ACH, according to an alternative exemplary embodiment of the invention. The exemplary method 500 is merely illustrative and, in alternative embodiments of the invention, certain steps can be performed in a different order, in parallel with one another, certain steps can be omitted entirely, and/or certain additional steps can be performed.

In step 502, the ODFI 127 creates one or more ACH items. In so doing, the ODFI 127 inserts into each ACH item a designated amount of foreign currency to be credited to the RDFI 107. The ODFI 127 does not determine, or enter into the ACH item, either the FX conversion rate or the amount of domestic currency corresponding to the designated amount of foreign currency. In step 503, the ODFI 127 collects the ACH item(s), bundled or unbundled, into at least one ACH file. In step 505, the ODFI 127 transmits the ACH file(s) comprising the ACH items to the ACH network 120.

The ACH network 120 unbundles the cross-border ACH items from the ACH file and transmits them to the USGO 115 in step 510. For each cross-border ACH item, the conversion module 116 of the USGO 115 interacts with the FX Agent 117 to determine the FX conversion rate, in step 513. In step 515, the conversion module 116 calculates, based on the FX conversion rate determined in step 513, the amount of domestic currency needed for the designated amount of foreign currency. In step 520, the conversion module 116 enters the calculated amount of domestic currency and the FX conversion rate into appropriate fields of the ACH item. Alternatively, the conversion module 116 can enter only the FX conversion rate or the domestic currency amount into the ACH item.

In step 521, the USGO 115 determines, for each cross-border ACH item, the FRGO 110 through which the USGO 115 will transmit the ACH item, to the RDFI 107. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110. In step 523, the USGO 115 collects ACH items destined for the same FRGO 110 into at least one new ACH file. Thus, for each FRGO 110 determined in step 521, the USGO 115 creates at least one ACH file. In step 524, the USGO 115 transmits each ACH file to its corresponding FRGO 110. Although not illustrated in exemplary process 500, the transmission of the ACH file from the USGO 115 to the FRGO 110 typically involves a conversion process from one file format to another file format.

In step 525, for each ACH item, the USGO 115 debits the account of the ODFI 127 and credits the account of the FX Agent 117. The debit and credit are in domestic currency. The amount of the debit can equal the amount of the credit, which can equal the domestic currency amount determined in step 515. In one embodiment of the invention, the amounts of the debit and the credit can vary, e.g., to account for processing fees and/or commissions. In step 530, the FX Agent 117 credits the account of the FRGO 110 in foreign currency. The amount of the credit can equal the foreign currency amount entered into the ACH item in step 502. In one embodiment of the invention, the amounts of the credit to the FRGO 110 and the foreign currency can vary, e.g., to account for processing fees and/or commissions.

In step 532, the FRGO 110 receives the ACH file(s) and unbundles each ACH item from the ACH file(s). In step 533, the FRGO 110 determines, for each ACH item, the RDFI 107 for which the ACH item is destined. In step 534, the FRGO 110 collects ACH items destined for the same RDFI 107 into at least one new ACH file and transmits the ACH file(s) to the RDFI 107. Thus, for each RDFI 107 determined in step 533, the FRGO 110 creates and transmits at least one new ACH file. In step 535, the FRGO 110 credits the account of each RDFI 107. The credit amount can equal the amount credited to the FRGO 110 in step 530 for that item. In one embodiment of the invention, the amounts of the credit to each RDFI 107 and the credit to the FRGO 110 can vary, e.g., to account for processing fees and/or commissions.

Figure 6:
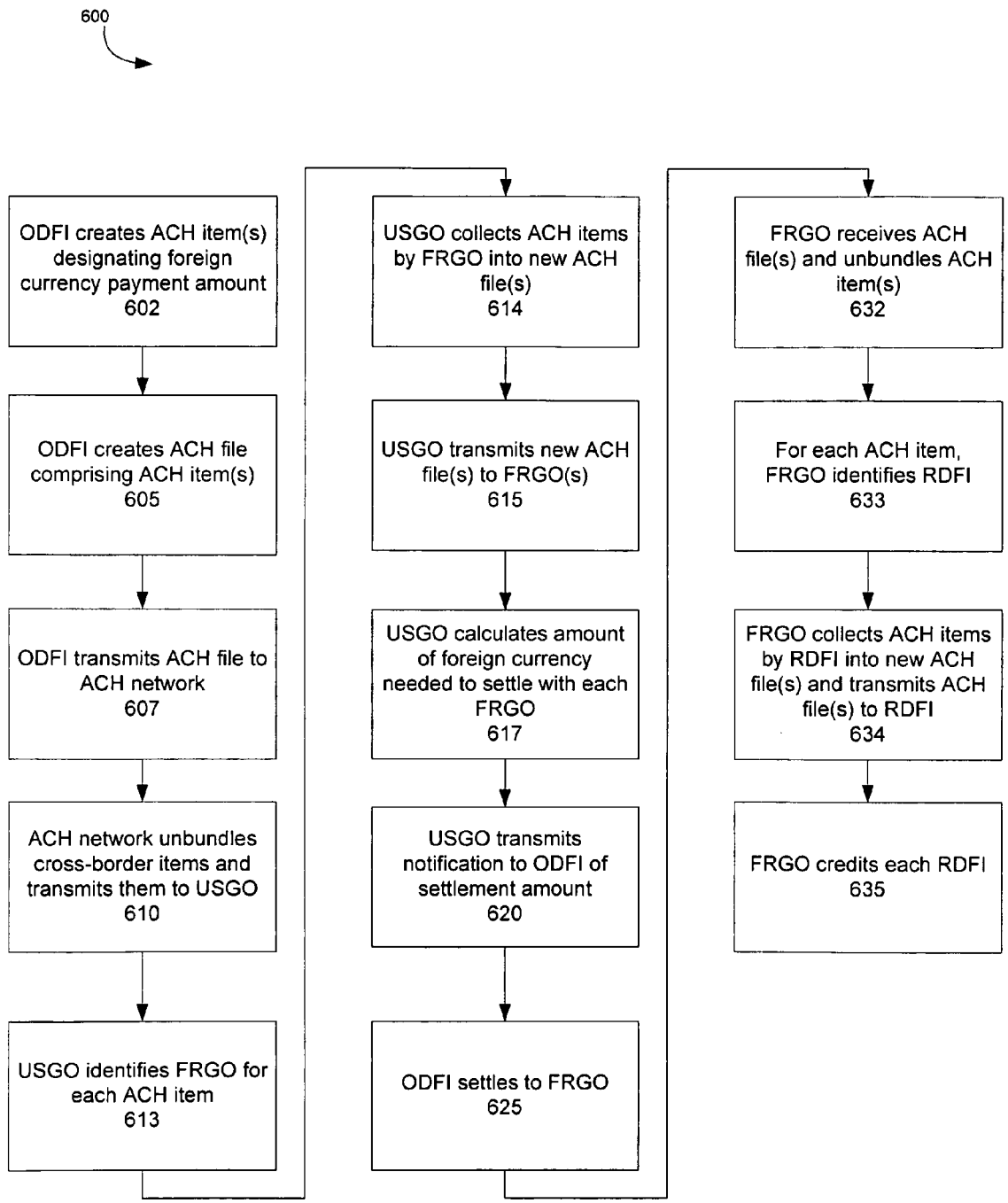
FIG. 6 is a flow chart diagram illustrating a method for managing fixed to fixed credit payments in an International ACH, according to an exemplary embodiment of the invention.

FIG. 6 is a flow chart diagram illustrating a method 600 for managing fixed to fixed credit payments in an International ACH, according to an exemplary embodiment of the invention. The exemplary method 600 is merely illustrative and, in alternative embodiments of the invention, certain steps can be performed in a different order, in parallel with one another, certain steps can be omitted entirely, and/or certain additional steps can be performed.

In step 602, the ODFI 127 creates one or more ACH items, e.g., from a customer, on a first banking day. In so doing, the ODFI 127 inserts into each ACH item a designated amount of foreign currency to be credited to the RDFI 107. The ODFI 127 does not determine, or enter into the ACH item, either the FX conversion rate or the amount of domestic currency corresponding to the designated amount of foreign currency. In step 605, the ODFI 127 collects the ACH item(s), bundled or unbundled, into at least one ACH file. In step 607, the ODFI 127 transmits the ACH file(s) comprising the ACH items to the ACH network 120. The ACH network 120 unbundles the cross-border ACH items from the ACH file and transmits them to the USGO 115 in step 610.

In step 613, the USGO 115 identifies, for each cross-border ACH item, the FRGO 110 through which the USGO 115 will transmit the ACH item to the RDFI 107. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110. In step 614, the USGO 115 collects ACH items destined for the same FRGO 110 into at least one new ACH file. Thus, for each FRGO 110 determined in step 613, the USGO 115 creates at least one ACH file. In step 615, the USGO 115 transmits each ACH file to its corresponding FRGO 110. Although not illustrated in exemplary process 600, the transmission of the ACH file from the USGO 115 to the FRGO 110 typically involves a conversion process from one file format to another file format.

In step 617, the USGO 115 calculates the aggregate amount of foreign currency needed by the ODFI 127 to settle with each FRGO 110. The aggregate amount can comprise the sum of the designated foreign currency amounts in the ACH items that the USGO 115 transmitted to the FRGO 110. Via the wide area network 130 or the ACH network 120, for example, the USGO 115 transmits to the ODFI 127 a notification comprising the aggregate foreign currency amount needed to settle with each FRGO 110, in step 620. The notification can include a list of each FRGO 110 along with the foreign currency amount needed to settle with each FRGO 110. In an alternative embodiment of the invention, the USGO 115 can transmit multiple notifications to the ODFI 127, each notification comprising the total foreign currency amount needed to settle with a particular FRGO 110. Each notification can include information about a single FRGO 110.

In step 625, the ODFI 127 settles to the FRGO 110, for example, by transmitting a wire payment directly to the FRGO 110 or by using an ODFI correspondent bank 305 in the same country as the FRGO 110. The ODFI correspondent bank 305 can comprise any financial institution that can assist the ODFI 127 in transmitting foreign currency funds to the FRGO 110 and/or another foreign entity. For example, the ODFI correspondent bank 305 can comprise an FX Agent or a branch office or other agent of the ODFI 127. For example, the ODFI 127 can instruct the ODFI correspondent bank 305 to credit the FRGO 110 in foreign currency. The amount of the credit can equal the amount designated in the notification(s) from the USGO 115. In one embodiment of the invention, the amounts of the credit to the FRGO 110 and the amount designated in the notification from the USGO 115 can vary, e.g., to account for processing fees and/or commissions. In an alternative embodiment of the invention, a party other than the ODFI 127 can initiate the transfer of funds from the ODFI 127 to the FRGO 110.

In step 632, the FRGO 110 receives the ACH file(s) and unbundles each ACH item from the ACH file(s). In step 633, the FRGO 110 determines, for each ACH item, the RDFI 107 for which the ACH item is destined. In step 634, the FRGO 110 collects ACH items destined for the same RDFI 107 into at least one new ACH file and transmits the ACH file(s) to the RDFI 107. Thus, for each RDFI 107 determined in step 633, the FRGO 110 creates and transmits at least one new ACH file. In step 635, the FRGO 110 credits the account of each RDFI 107. The credit amount can equal the amount credited to the FRGO 110 in step 625 for that item. In one embodiment of the invention, the amounts of the credit to each RDFI 107 and the credit to the FRGO 110 can vary, e.g., to account for processing fees and/or commissions.

Figure 8:
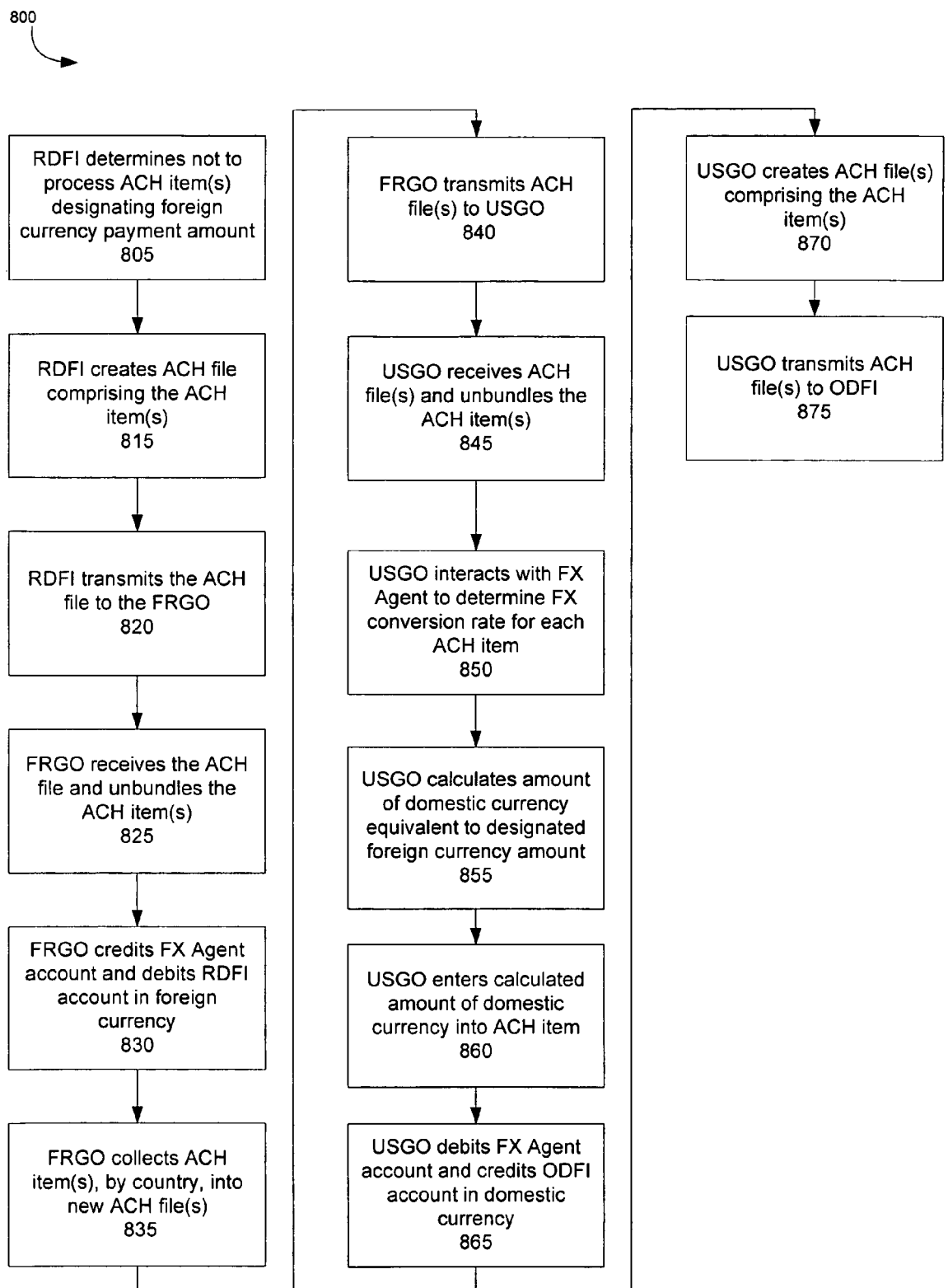
FIG. 8 is a flow chart diagram illustrating a method for managing return variable to fixed credit payments in an International ACH, according to an exemplary embodiment of the invention.

FIG. 8 is a flow chart diagram illustrating a method 800 for managing return variable to fixed credit payments in an International ACH, according to an exemplary embodiment of the invention. The exemplary method 800 is merely illustrative and, in alternative embodiments of the invention, certain steps can be performed in a different order, in parallel with one another, certain steps can be omitted entirely, and/or certain additional steps can be performed.

In step 805, the RDFI 107 determines not to process one or more ACH items designating a foreign currency payment amount. For example, the RDFI 107 can determine not to process an ACH item because the ACH item designates a credit to a closed bank account. In step 815, the RDFI 107 collects the unprocessed ACH item(s), bundled or unbundled, in at least one ACH file. In step 820, the RDFI 107 transmits the ACH file(s) comprising the ACH items to the FRGO 110. The FRGO 110 receives the ACH file and unbundles the cross-border ACH items from the ACH file(s) in step 825.

In step 830, for each ACH item, the FRGO 110 credits an account of the FX Agent 117 and debits an account of the RDFI 107. The debit and credit are in foreign currency. The amount of the debit can equal the amount of the credit, which can equal the foreign currency payment amount designated in the ACH item. In one embodiment of the invention, the amounts of the debit and the credit can vary, e.g., to account for processing fees and/or commissions. In step 835, the FRGO 110 collects ACH items destined for the same country in one or more new ACH files. For example, the FRGO 110 can collect ACH items destined for ODFIs 127 located in the U.S. in one or more new ACH files. Each such ACH file can comprise at least one ACH item destined for a U.S. ODFI 127.

In step 840, the FRGO 110 transmits the ACH file(s) comprising at least one ACH item destined for a U.S. ODFI 127 to the USGO 115. The USGO 115 receives the ACH file(s) and unbundles the ACH item(s) from the ACH file(s) in step 845. In step 850, the conversion module 116 of the USGO 115 interacts with the FX Agent 117 to determine an FX conversion rate for each ACH item. Based on the FX conversion rate, the conversion module 116 calculates an amount of domestic currency that is equivalent to the designated foreign currency payment amount of the ACH item, in step 855. In step 860, the conversion module 116 enters the calculated amount of domestic currency into the ACH item.

In step 865, for each ACH item, the USGO 115 debits an account of the FX Agent 117 and credits an account of the ODFI 127. The debit and credit are in domestic currency. The amount of the debit can equal the amount of the credit, which can equal the domestic currency amount determined in step 855. In one embodiment of the invention, the amounts of the debit and the credit can vary, e.g., to account for processing fees and/or commissions. In step 870, the USGO 115 collects the ACH items destined for the same ODFI 127 in one or more new ACH files. Each ACH file can comprise at least one ACH item destined for the ODFI 127. In step 875, the USGO 115 transmits the ACH file(s) to the ODFI 127.

Figure 9:
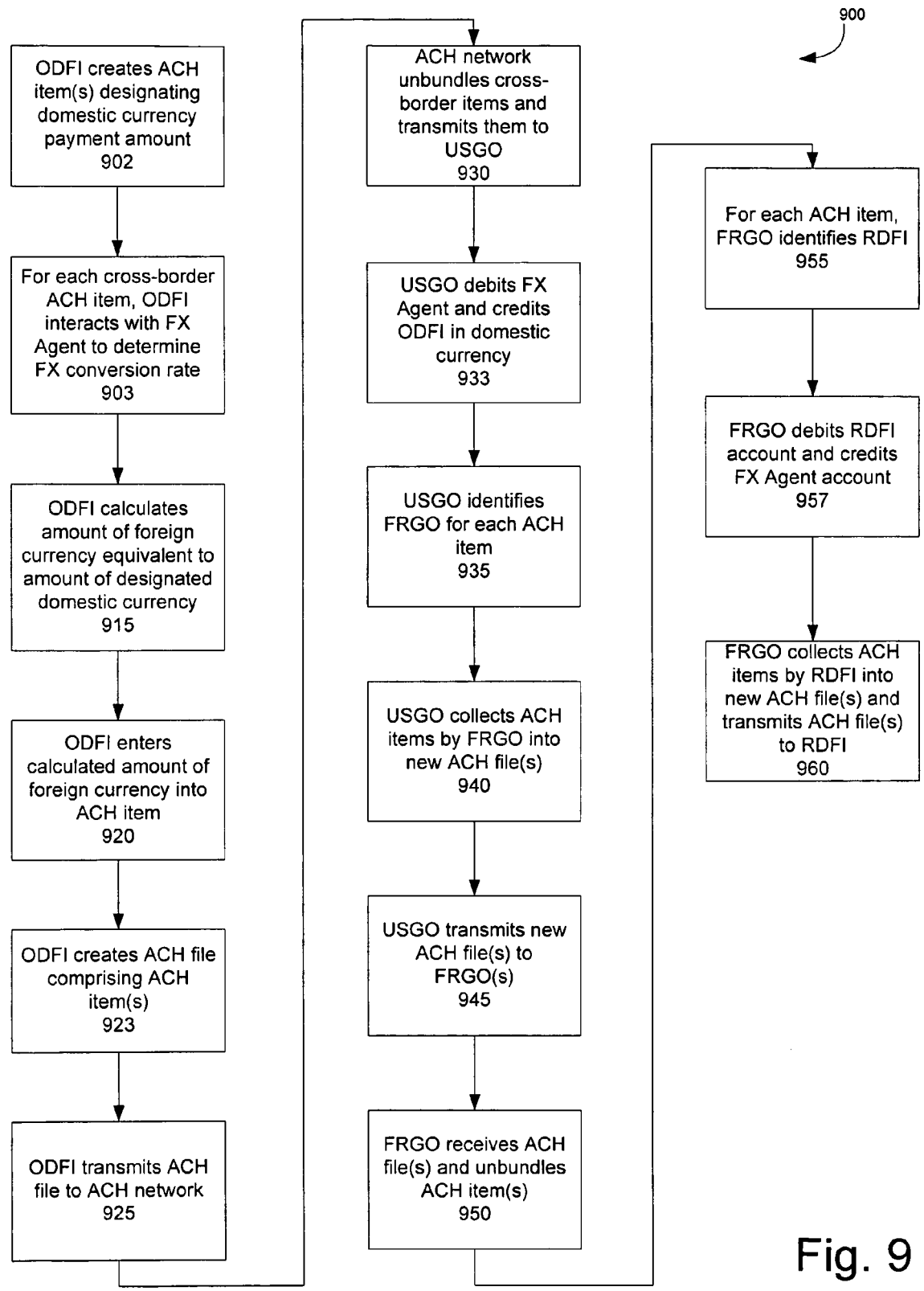
FIG. 9 is a flow chart diagram illustrating a method for managing variable to fixed debit payments in an International ACH, according to an exemplary embodiment of the invention.

FIG. 9 is a flow chart diagram illustrating a method for managing variable to fixed debit payments in an International ACH, according to an exemplary embodiment of the invention. The exemplary method 900 is merely illustrative and, in alternative embodiments of the invention, certain steps can be performed in a different order, in parallel with one another, certain steps can be omitted entirely, and/or certain additional steps can be performed.

In step 902, the ODFI 127 creates one or more ACH items on a first banking day. In so doing, the ODFI 127 inserts into each ACH item a designated amount of domestic currency to receive from the RDFI 107. For each cross-border ACH item, the conversion module 116 of the ODFI 127 interacts with the FX Agent 117 to determine an FX conversion rate, in step 903. In step 915, the conversion module 116 calculates, based on the FX conversion rate determined in step 903, the amount of foreign currency equivalent to the amount of designated domestic currency. In step 920, the conversion module 116 enters the calculated amount of foreign currency into an appropriate field of the ACH item. Alternatively, the conversion module 116 can enter the FX conversion rate, either alone or in conjunction with the foreign currency amount, into the ACH item. In an alternative embodiment of the invention, similar to that described with regard to a VF credit payment in FIG. 5, the ODFI 127 can allow the USGO 115 to instead determine the FX conversion rate, calculate the equivalent foreign currency amount, and enter the FX conversion rate and/or the equivalent foreign currency amount into the ACH item. In such an embodiment, the USGO 115 can locally or remotely access the conversion module 116.

In step 923, the ODFI 127 collects the ACH item(s), bundled or unbundled, in at least one ACH file. In step 925, the ODFI 127 transmits the ACH file(s) comprising the ACH items to the ACH network 120. The ACH network 120 unbundles the cross-border ACH items from the ACH file and transmits them to the USGO 115 in step 930. In step 933, for each ACH item, the USGO 115 debits the account of the FX Agent 117 and credits the account of the ODFI 127. The debit and credit are in domestic currency. The amount of the debit can equal the amount of the credit, which can equal the domestic currency amount entered in the ACH item. In one embodiment of the invention, the amounts of the debit and the credit can vary, e.g., to account for processing fees and/or commissions.

In step 935, the USGO 115 identifies, for each cross-border ACH item, the FRGO 110 through which the USGO 115 will transmit the ACH item, to the RDFI 107. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110. In step 940, the USGO 115 collects ACH items destined for the same FRGO 110 into at least one new ACH file. Thus, for each FRGO 110 determined in step 935, the USGO 115 creates at least one ACH file. In step 945, the USGO 115 transmits each ACH file to its corresponding FRGO 110. Although not illustrated in exemplary process 900, the transmission of the ACH file from the USGO 115 to the FRGO 110 typically involves a conversion process from one file format to another file format.

In step 950, the FRGO 110 receives the ACH file and unbundles each ACH item from the ACH file. In step 955, the FRGO 110 identifies, for each ACH item, the RDFI 107 for which the ACH item is destined. In step 957, the FRGO 110 debits an account of the RDFI 107 and credits an account of the FX Agent. The debit and credit are in foreign currency. The amount of the debit can equal the amount of the credit, which can equal the foreign currency amount determined in step 915. In one embodiment of the invention, the amounts of the debit and the credit can vary, e.g., to account for processing fees and/or commissions. In step 960, the FRGO 110 collects ACH items destined for the same RDFI 107 into at least one new ACH file and transmits the ACH file(s) to the RDFI 107. Thus, for each RDFI 107 determined in step 955, the FRGO 110 creates and transmits at least one new ACH file.

Figure 10:
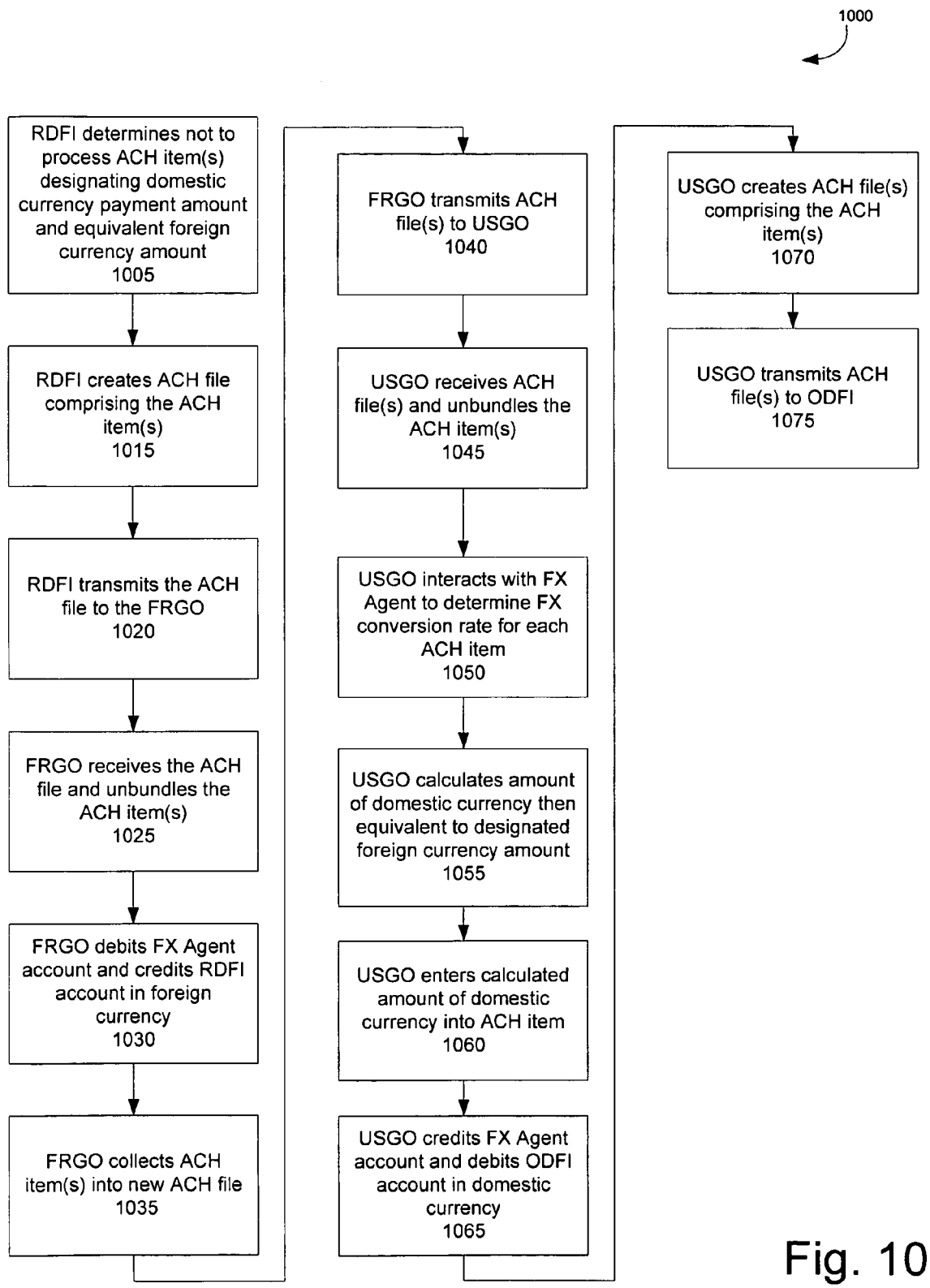
FIG. 10 is a flow chart diagram illustrating a method for managing return variable to fixed debit payments in an International ACH, according to an exemplary embodiment of the invention.

FIG. 10 is a flow chart diagram illustrating a method for managing return variable to fixed debit payments in an International ACH, according to an exemplary embodiment of the invention. The exemplary method 1000 is merely illustrative and, in alternative embodiments of the invention, certain steps can be performed in a different order, in parallel with one another, certain steps can be omitted entirely, and/or certain additional steps can be performed.

In step 1005, the RDFI 107 determines not to process at least one ACH item designating a domestic currency payment amount and an amount of foreign currency equivalent to the domestic currency payment amount. In an alternative embodiment of the invention, the ACH item can designate a domestic currency payment amount and an FX conversion rate by which an equivalent foreign currency payment amount can be determined. For example, the RDFI 107 can determine not to process the ACH item because the ACH item designates a debit from a closed bank account or an account with insufficient funds.

In step 1015, the RDFI 107 collects the unprocessed ACH item(s), bundled or unbundled, in at least one ACH file. In step 1020, the RDFI 107 transmits the ACH file(s) comprising the ACH items to the FRGO 110. The FRGO 110 receives the ACH file and unbundles the cross-border ACH items from the ACH file in step 1025. In step 1030, for each ACH item, the FRGO 110 debits an account of the FX Agent 117 and credits an account of the RDFI 107. The debit and credit are in foreign currency. The amount of the debit can equal the amount of the credit, which can equal the foreign currency payment amount designated in the ACH item. In one embodiment of the invention, the amounts of the debit and the credit can vary, e.g., to account for processing fees and/or commissions. In step 1035, the FRGO 110 collects ACH items destined for the same country in one or more new ACH files. For example, the FRGO 110 can collect ACH items destined for ODFIs 127 located in the U.S. in one or more new ACH files. Each such ACH file can comprise at least one ACH item destined for a U.S. ODFI 127.

In step 1040, the FRGO 110 transmits the ACH file(s) comprising at least one ACH item destined for a U.S. ODFI 127 to the USGO 115. The USGO 115 receives the ACH file(s) and unbundles the ACH item(s) from the ACH file(s) in step 1045. In step 1050, the conversion module 116 of the USGO 115 interacts with the FX Agent 117 to determine an FX conversion rate for each ACH item. Based on the FX conversion rate, the conversion module 116 calculates an amount of domestic currency that is equivalent to the designated foreign currency payment amount of the ACH item, in step 1055. In step 1060, the conversion module 116 enters the calculated amount of domestic currency into the ACH item.

In step 1065, for each ACH item, the USGO 115 credits an account of the FX Agent 117 and debits an account of the ODFI 127. The debit and credit are in domestic currency. The amount of the debit can equal the amount of the credit, which can equal the domestic currency amount determined in step 1055. In one embodiment of the invention, the amounts of the debit and the credit can vary, e.g., to account for processing fees and/or commissions. In step 1070, the USGO 115 collects the ACH items destined for the same ODFI 127 in one or more new ACH files. Each ACH file can comprise at least one ACH item destined for the ODFI 127. In step 1075, the USGO 115 transmits the ACH file(s) to the ODFI 127.

Figure 11:
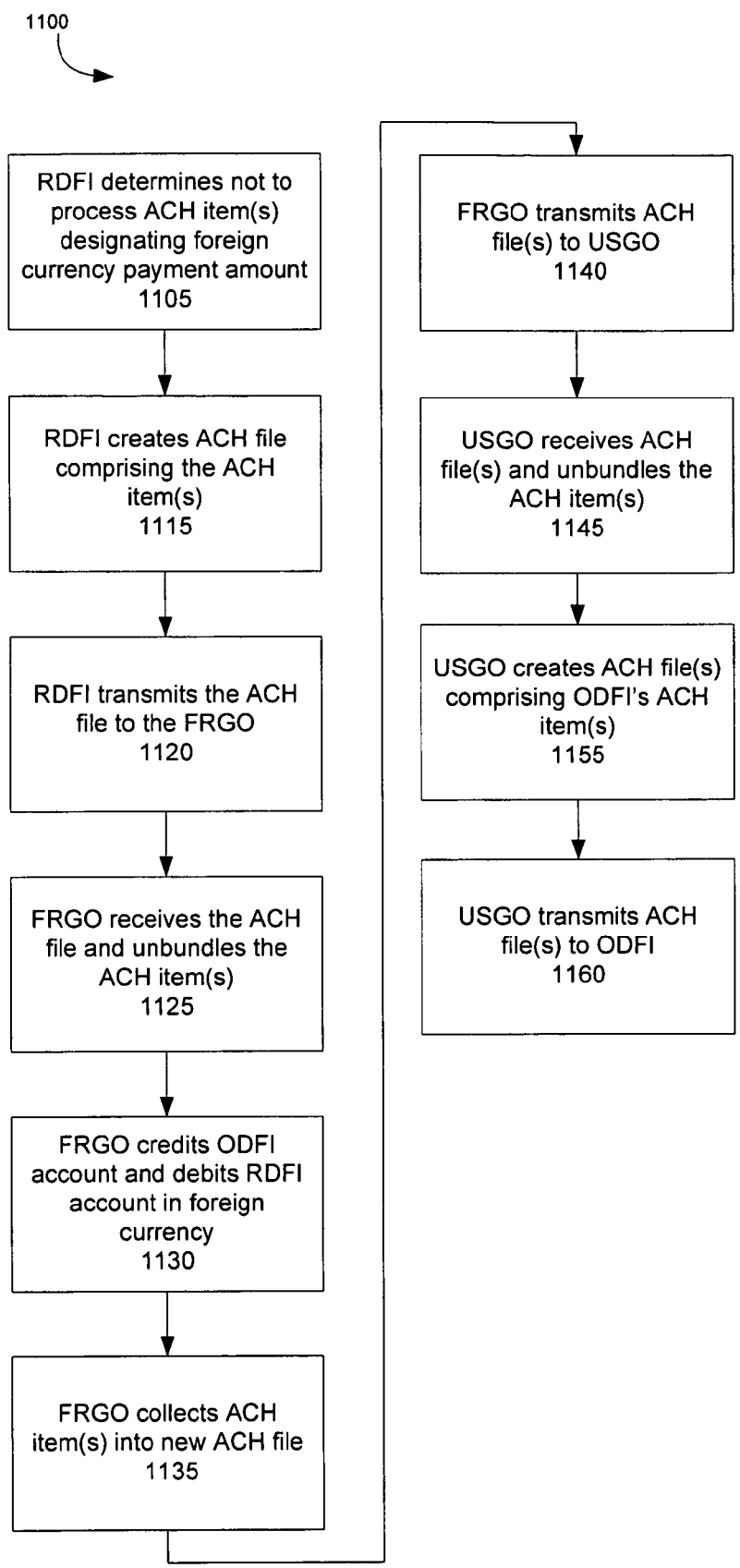
FIG. 11 is a flow chart diagram illustrating a method for managing return fixed to fixed credit payments in an International ACH, according to an exemplary embodiment of the invention.

FIG. 11 is a flow chart diagram illustrating a method for managing return fixed to fixed credit payments in an International ACH, according to an exemplary embodiment of the invention. The exemplary method 1100 is merely illustrative and, in alternative embodiments of the invention, certain steps can be performed in a different order, in parallel with one another, certain steps can be omitted entirely, and/or certain additional steps can be performed.

In step 1105, the RDFI 107 determines not to process one or more ACH items that each designates a foreign currency payment amount. For example, the RDFI 107 can determine not to process the ACH item because the ACH item designates a credit to a closed bank account. In step 1115, the RDFI 107 collects the unprocessed ACH item(s), bundled or unbundled, in at least one ACH file. In step 1120, the RDFI 107 transmits the ACH file(s) comprising the ACH items to the FRGO 110. The FRGO 110 receives the ACH file and unbundles the cross-border ACH items from the ACH file(s) in step 1125.

In step 1130, for each ACH item, the FRGO 110 credits an account of the ODFI 127, e.g., in the ODFI correspondent bank 305, and debits an account of the RDFI 107. The credit and the debit are in foreign currency. The amount of the debit can equal the amount of the credit, which can equal the foreign currency payment amount designated in the ACH item. In one embodiment of the invention, the amounts of the debit and the credit can vary, e.g., to account for processing fees and/or commissions. In step 1135, the FRGO 110 collects ACH items destined for the same country in one or more new ACH files. For example, the FRGO 110 can collect ACH items destined for ODFIs 127 located in the U.S. in one or more new ACH files. Each such ACH file can comprise at least one ACH item destined for a U.S. ODFI 127.

In step 1140, the FRGO 110 transmits the ACH file(s) comprising at least one ACH item destined for a U.S. ODFI 127 to the USGO 115. The USGO 115 receives the ACH file(s) and unbundles the ACH item(s) from the ACH file(s) in step 1145. In step 1155, the USGO 115 collects the ACH items destined for the same ODFI 127 in one or more new ACH files. Each ACH file can comprise at least one ACH item destined for the ODFI 127. In step 1160, the USGO 115 transmits the ACH file(s) to the ODFI 127. The ODFI 127 can review each ACH item in the ACH file(s) to verify that the correct amount of money was credited to the ODFI's account.

Figure 12:
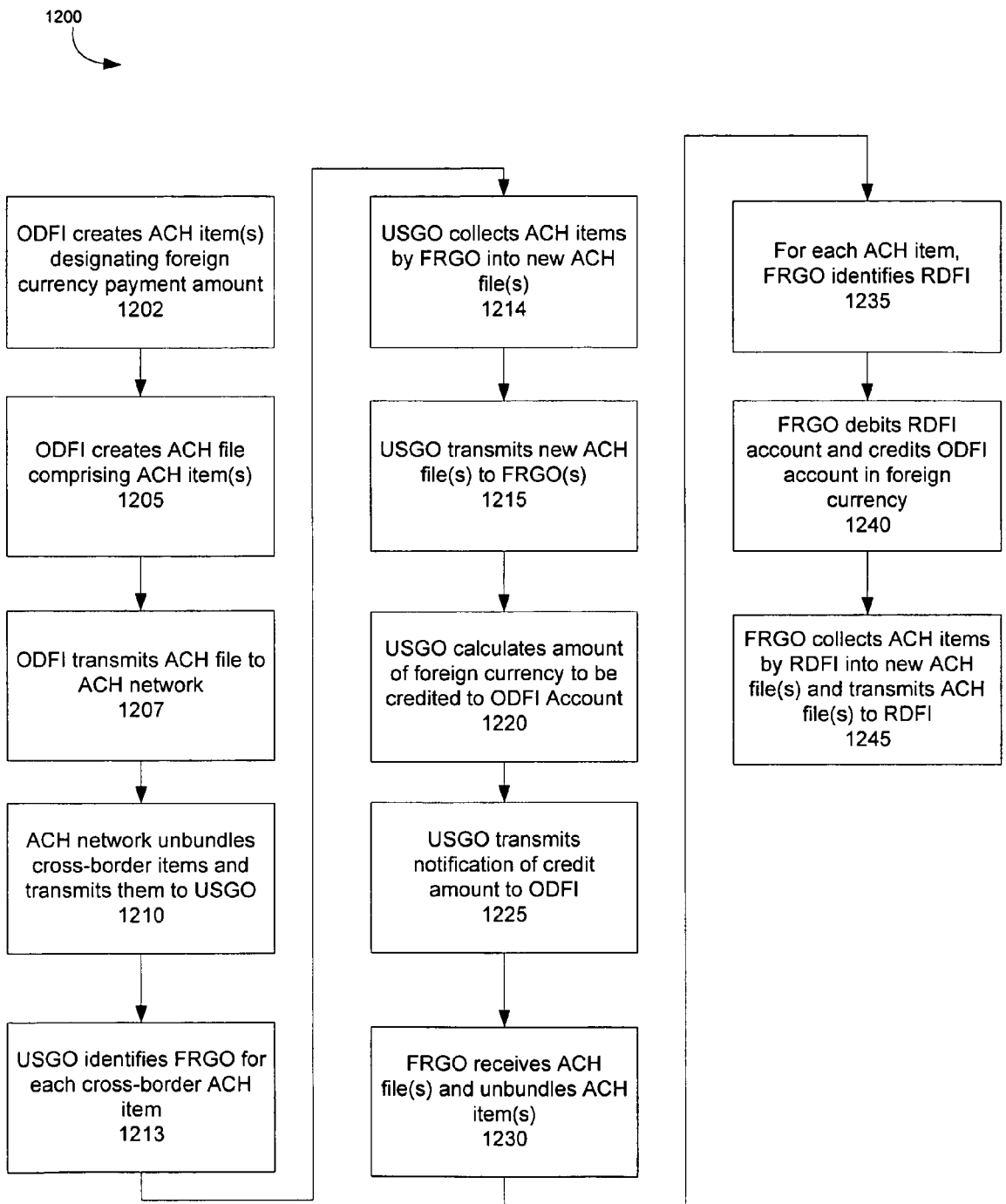
FIG. 12 is a flow chart diagram illustrating a method for managing fixed to fixed debit payments in an International ACH, according to an exemplary embodiment of the invention.

FIG. 12 is a flow chart diagram illustrating a method for managing fixed to fixed debit payments in an International ACH, according to an exemplary embodiment of the invention. The exemplary method 1200 is merely illustrative and, in alternative embodiments of the invention, certain steps can be performed in a different order, in parallel with one another, certain steps can be omitted entirely, and/or certain additional steps can be performed.

In step 1202, the ODFI 127 creates one or more ACH items on a first banking day. In so doing, the ODFI 127 inserts into each ACH item a designated amount of foreign currency to receive from the RDFI 107. In step 1205, the ODFI 127 collects the ACH item(s), bundled or unbundled, in at least one ACH file. In step 1207, the ODFI 127 transmits the ACH file(s) comprising the ACH items to the ACH network 120. The ACH network 120 unbundles the cross-border ACH items from the ACH file and transmits them to the USGO 115 in step 1210. In step 1213, the USGO 115 identifies, for each cross-border ACH item, the FRGO 110 through which the USGO 115 will transmit the ACH item, to the RDFI 107. Depending on the location of each RDFI 107, the USGO 115 can transmit each ACH item to a different FRGO 110. For example, if a first ACH item is destined for a Japanese RDFI 107 and a second ACH item is destined for a European RDFI 107, the USGO 115 can transmit the first ACH item to a Japanese FRGO 110 and the second ACH item to a European FRGO 110.

In step 1214, the USGO 115 collects ACH items destined for the same FRGO 110 into at least one new ACH file. Thus, for each FRGO 110 determined in step 1213, the USGO 115 creates at least one ACH file. In step 1215, the USGO 115 transmits each ACH file to its corresponding FRGO 110.

Although not illustrated in exemplary process 1200, the transmission of the ACH file from the USGO 115 to the FRGO 110 typically involves a conversion process from one file format to another file format.

In step 1220, the USGO 115 calculates the aggregate amount of foreign currency to be credited to the account of the ODFI 127. The aggregate amount can comprise the sum of the designated foreign currency amounts in the ACH items that the USGO 115 transmitted to the FRGO 110. Via the wide area network 130 or the ACH network 120, for example, the USGO 115 transmits to the ODFI 127 a notification comprising the calculated amount, in step 1225. The notification can include a list of each FRGO 110 along with the foreign currency amount expected from each FRGO 110. In an alternative embodiment of the invention, the USGO 115 can transmit multiple notifications to the ODFI 127, each notification comprising the total foreign currency amount expected from a particular FRGO 110. Each notification can include information about a single FRGO 110.

In step 1230, the FRGO 110 receives the ACH file and unbundles each ACH item from the ACH file. In step 1235, the FRGO 110 identifies, for each ACH item, the RDFI 107 for which the ACH item is destined. In step 1240, the FRGO 110 debits an account of the RDFI 107 and credits an account of the ODFI 127, e.g., in the ODFI correspondent bank 305. The debit and credit are in foreign currency. The amount of the debit can equal the amount of the credit, which can equal the foreign currency amount designated in the ACH item. In one embodiment of the invention, the amounts of the debit and the credit can vary, e.g., to account for processing fees and/or commissions. In step 1245, the FRGO 110 collects ACH items destined for the same RDFI 107 into at least one new ACH file and transmits the ACH file(s) to the RDFI 107. Thus, for each RDFI 107 determined in step 1235, the FRGO 110 creates and transmits at least one new ACH file.

Figure 13:
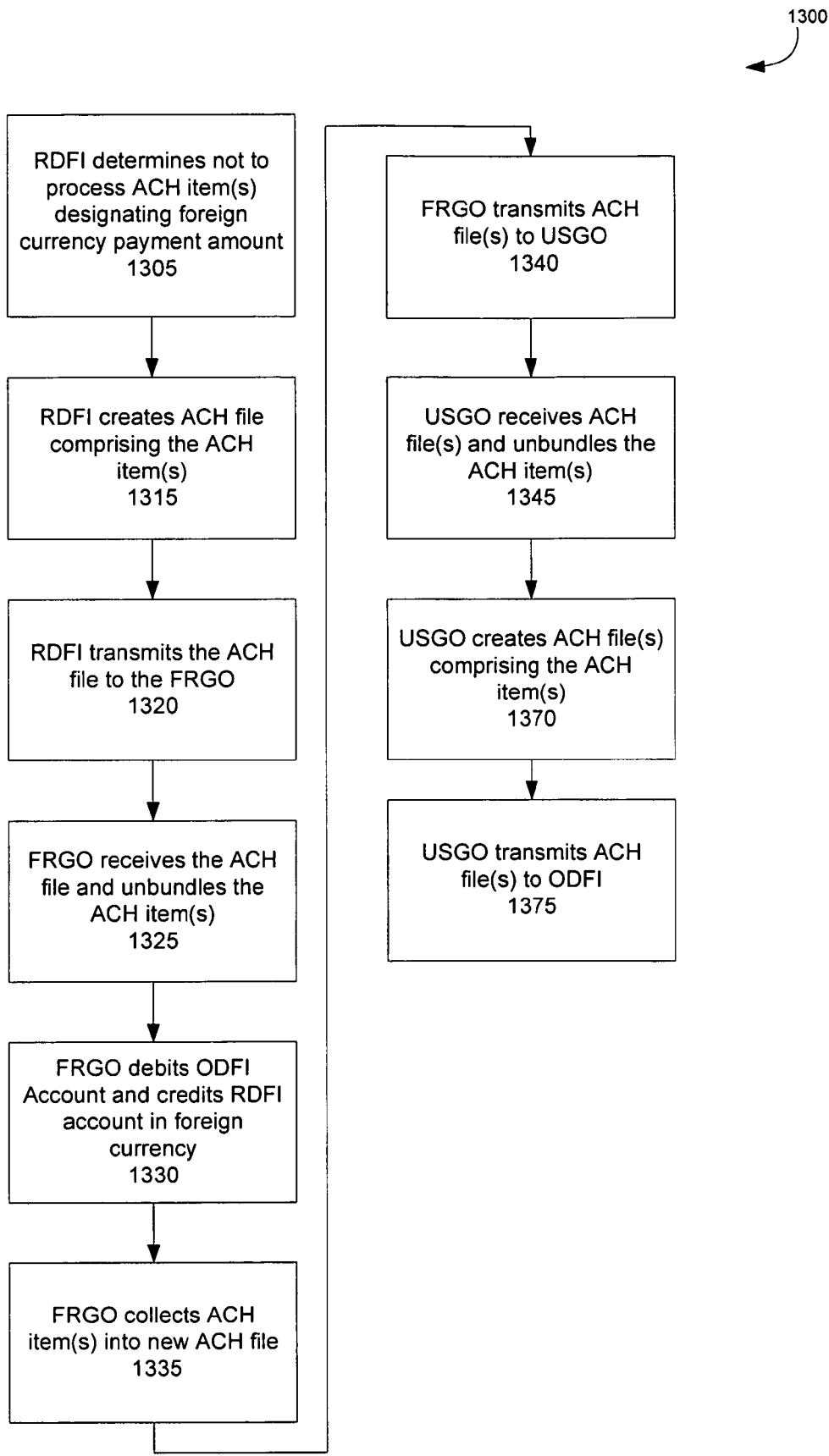
FIG. 13 is a flow chart diagram illustrating a method for managing return fixed to fixed debit payments in an International ACH, according to an exemplary embodiment of the invention.

FIG. 13 is a flow chart diagram illustrating a method for managing return fixed to fixed debit payments in an International ACH, according to an exemplary embodiment of the invention. The exemplary method 1300 is merely illustrative and, in alternative embodiments of the invention, certain steps can be performed in a different order, in parallel with one another, certain steps can be omitted entirely, and/or certain additional steps can be performed.

In step 1305, the RDFI 107 determines not to process at least one ACH item designating a foreign currency payment amount. For example, the RDFI 107 can determine not to process the ACH item because the ACH item designates a debit from a closed bank account or an account with insufficient funds. In step 1315, the RDFI 107 collects the unprocessed ACH item(s), bundled or unbundled, in at least one ACH file. In step 1320, the RDFI 107 transmits the ACH file(s) comprising the ACH items to the FRGO 110. The FRGO 110 receives the ACH file and unbundles the cross-border ACH items from the ACH file in step 1325. In step 1330, for each ACH item, the FRGO 110 debits an account of the ODFI 127, e.g., in the ODFI correspondent bank 305, and credits an account of the RDFI 107. The debit and credit are in foreign currency. The amount of the debit can equal the amount of the credit, which can equal the foreign currency payment amount designated in the ACH item. In one embodiment of the invention, the amounts of the debit and the credit can vary, e.g., to account for processing fees and/or commissions. In step 1335, the FRGO 110 collects ACH items destined for the same country in one or more new ACH files. For example, the FRGO 110 can collect ACH items destined for ODFIs 127 located in the U.S. in one or more new ACH files. Each such ACH file can comprise at least one ACH item destined for a U.S. ODFI 127.

In step 1340, the FRGO 110 transmits the ACH file(s) comprising at least one ACH item destined for a U.S. ODFI 127 to the USGO 115. The USGO 115 receives the ACH file(s) and unbundles the ACH item(s) from the ACH file(s) in step 1345. In step 1370, the USGO 115 collects the ACH items destined for the same ODFI 127 in one or more new ACH files. Each ACH file can comprise at least one ACH item destined for the ODFI 127. In step 1375, the USGO 115 transmits the ACH file(s) to the ODFI 127. The ODFI 127 can review each ACH item in the ACH file(s) to verify that the correct amount of money was debited from the ODFI's account.

In conclusion, the invention, as represented in the foregoing exemplary embodiments, provides systems and methods for managing foreign payments in an International ACH. An ODFI can create a payment instruction that designates a fixed amount of foreign currency to be credited to an RDFI. The ODFI can also create a payment instruction that designates a fixed amount of domestic currency to be credited to the ODFI from an RDFI. Each payment can be either a variable to fixed payment or a fixed to fixed payment. In a variable to fixed credit payment, the ODFI can create an ACH item on a first banking day. A conversion module of the ODFI or the USGO can interact with an FX Agent to determine an FX conversion rate and an amount of domestic currency corresponding to the foreign currency that the conversion module can enter into the ACH item. The ODFI/USGO can transmit the ACH item to the FRGO. On a second banking day, the ODFI can settle with the FX Agent in domestic currency. The FX Agent can settle with the FRGO, which can deliver funds to the RDFI, in foreign currency, on the second or a third banking day.

In a variable to fixed debit payment, the ODFI can create an ACH item designating a fixed domestic currency payment amount on a first banking day. The conversion module can determine the FX conversion rate and the amount of foreign currency corresponding to the domestic currency that the conversion module can enter into the ACH item. The USGO can settle good funds to the ODFI on the first or a second banking day. The USGO can transmit the ACH item to the FRGO which can debit the RDFI, in foreign currency, on the second or a third banking day.

In a fixed to fixed payment, the ODFI can use the International ACH network to transmit information about the foreign currency payment to the USGO, the FRGO, and the RDFI. The payment can be settled via ACH or non-ACH means.

It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

I claim:

1. A computer-implemented method for managing a foreign payment in an international automated clearinghouse ("ACH"), comprising the steps of:

creating at a domestic originating depository financial institution ("ODFI") located in the United States an ACH item designating, in a foreign currency, a payment amount to a receiving depository financial institution located outside of the United States;

interacting, via a conversion module of the ODFI, with a foreign exchange agent to determine a foreign exchange conversion rate for the foreign currency;

calculating, by the conversion module, an amount of domestic currency equivalent to the foreign currency payment amount based on the determined foreign exchange conversion rate;

entering, by the conversion module, at the ODFI, the calculated amount of domestic currency into the ACH item;

electronically transmitting, by the ODFI, the ACH item comprising the foreign currency payment amount and the entered, calculated amount of domestic currency, from the ODFI to an ACH network for payment of the payment amount to the receiving depository institution;

debiting the calculated amount of domestic currency from an account of the ODFI and crediting the calculated amount of domestic currency to an account of the foreign exchange agent; and debiting the foreign currency payment amount from the account of the foreign exchange agent and crediting the foreign currency payment amount to an account of the receiving depositing financial institution, wherein the conversion module is implemented in a computer system that comprises instructions stored in a machine-readable medium and a processor that executes the instructions, and at least one of the debited and credited amounts is varied to account for a fee or commission.

2. The computer-implemented method according to claim 1, wherein the step of electronically transmitting the ACH item comprises:

collecting the ACH item in an ACH file in a NACHA file format; and transmitting the ACH file from the domestic originating depository financial institution to the ACH network.

3. The computer-implemented method according to claim 1, further comprising the step of debiting an account of the domestic originating depository financial institution, the debit comprising the calculated amount of domestic currency that is credited to an account of the foreign exchange agent in domestic currency.

4. The computer-implemented method according to claim 1, wherein the step of electronically transmitting the ACH item occurs on a first banking day, and the payment to the receiving depository institution occurs on a second banking day, which is later than the first banking day, wherein the foreign exchange conversion rate is guaranteed by the foreign exchange agent from the first banking day until at least the second banking day.

5. A computer-implemented method for managing a foreign payment in an international automated clearinghouse ("ACH"), comprising the steps of:

receiving at a domestic gateway operator located in the United States an ACH item designating, in a foreign currency, a payment amount to be transmitted from an originating depository financial institution located in the United States to a receiving depository financial institution located in a foreign country;

identifying, by a conversion module, an amount of domestic currency equivalent to the foreign currency payment amount, the amount of domestic currency determined based on a foreign exchange conversion rate provided by a foreign exchange agent;

entering, by the conversion module, the identified amount of domestic currency into the ACH item;

debiting, by the domestic gateway operator, the amount of domestic currency from an account of the originating depository financial institution and crediting, by the domestic gateway operator, the amount of domestic currency to an account of the foreign exchange agent;

electronically transmitting, by the domestic gateway operator, the ACH item, which comprises the entered, identified amount of domestic currency, from the domestic gateway operator to a foreign gateway operator, which coordinates payment to the receiving depository financial institution; and debiting, by the foreign gateway operator, the foreign currency payment amount from the account of the foreign exchange agent and crediting, by the foreign gateway operator, the foreign currency payment amount to an account of the receiving depository financial institution, wherein the conversion module is implemented in a computer system that comprises instructions stored in a machine-readable medium and a processor that executes the instructions, and at least one of the debited and credited amounts is varied to account for a fee or commission.

6. The computer-implemented method according to claim 5, wherein the step of electronically transmitting the ACH item, which comprises the entered, identified amount of domestic currency, occurs on a first banking day, and the foreign gateway operator coordinates payment to the receiving depository institution on a second banking day, which is later than the first banking day, wherein the foreign exchange conversion rate is guaranteed by the foreign exchange agent from the first banking day until at least the second banking day.

7. The computer-implemented method according to claim 5, wherein the step of receiving at the domestic gateway operator the ACH item comprises the step of unbundling the ACH item from an ACH file in a NACHA file format.

8. The computer-implemented method according to claim 5, wherein the ACH item received at the domestic gateway operator comprises the foreign exchange conversion rate.

9. A computer-implemented method for managing a foreign payment in an international automated clearinghouse ("ACH"), comprising the steps of:

receiving at a domestic gateway operator located in the United States an ACH item designating, in a foreign currency, a payment amount to be transmitted from an originating depository financial institution located in the United States to a receiving depository financial institution located in a foreign country, and comprising a foreign exchange conversion rate provided by a foreign exchange agent;

calculating, by a conversion module, an amount of domestic currency equivalent to the foreign currency payment amount based on the foreign exchange conversion rate;

entering, by the conversion module, the calculated amount of domestic currency into the ACH item;

debiting, by the domestic gateway operator, the amount of domestic currency from an account of the originating depository financial institution and crediting, by the domestic gateway operator, the amount of domestic currency to an account of the foreign exchange agent;

electronically transmitting, by the domestic gateway operator, the ACH item, which comprises the entered, calculated amount of domestic currency, from the domestic gateway operator to a foreign gateway operator, which coordinates payment to the receiving depository financial institution; and debiting, by the foreign gateway operator, the foreign currency payment amount from the account of the foreign exchange agent and crediting, by the foreign gateway operator, the foreign currency payment amount to an account of the receiving depository financial institution, wherein the conversion module is implemented in a computer system that comprises instructions stored in a machine-readable medium and a processor that executes the instructions, and at least one of the debited and credited amounts is varied to account for a fee or commission.

10. The computer-implemented method according to claim 9, wherein the step of receiving at the domestic gateway operator the ACH item comprises the step of unbundling the ACH item from an ACH file in a NACHA file format.

11. The computer-implemented method according to claim 9, wherein the step of electronically transmitting the ACH item occurs on a first banking day, and the foreign gateway operator coordinates payment to the receiving depository institution on a second banking day, which is later than the first banking day,
wherein the foreign exchange conversion rate is guaranteed by the foreign exchange agent from the first banking day until at least the second banking day.

12. A computer-implemented method for managing a foreign payment in an international automated clearinghouse ("ACH") comprising the steps of:
receiving at a domestic gateway operator located in the United States an ACH item designating a payment amount, in a foreign currency, to be transmitted from an originating depository financial institution located in the United States to a foreign receiving depository financial institution located outside of the United States;
interacting with a foreign exchange agent to determine a foreign exchange conversion rate for the foreign currency;
calculating, by a conversion module, an amount of domestic currency equivalent to the foreign currency payment amount based on the determined foreign exchange conversion rate;
entering, by the conversion module, the calculated amount of domestic currency into the ACH item;
debiting, by the domestic gateway operator, the calculated amount of domestic currency from an account of the originating depository financial institution and crediting, by the domestic gateway operator, the calculated amount of domestic currency to an account of the foreign exchange agent;
electronically transmitting, by the domestic gateway operator, on a first banking day, the ACH item comprising the foreign currency payment amount and the entered, calculated amount of the domestic currency from the domestic gateway operator to a foreign gateway operator, which coordinates payment to the receiving depository financial institution on a second banking day, which is later than the first banking day, the foreign exchange conversion rate being guaranteed by the foreign exchange agent from the first banking day until at least the second banking day; and
debiting, by the foreign gateway operator, the foreign currency payment amount from the account of the foreign exchange agent and crediting, by the foreign gateway operator, the foreign currency payment amount to an account of the foreign receiving depositing institution, wherein the conversion module is implemented in a computer system that comprises instructions stored in a machine-readable medium and a processor that executes the instructions, and at least one of the debited and credited amounts is varied to account for a fee or commission.

13. The computer-implemented method according to claim 12, wherein the step of receiving at the domestic gateway operator the ACH item comprises the step of unbundling the ACH item from an ACH file in a NACHA file format.

14. The computer-implemented method according to claim 12, wherein the step of receiving at the domestic gateway operator the ACH item comprises the step of receiving the ACH item from a domestic originating depository financial institution.

15. The computer-implemented method according to claim 12, wherein
debiting the foreign currency payment amount from the account of the foreign exchange agent and crediting the foreign currency payment amount to an account of the foreign receiving depositing institution comprises
debiting the foreign currency payment amount from the account of the foreign exchange agent and crediting the foreign currency payment amount to an account of the foreign gateway operator; and
debiting the foreign currency payment amount from the account of the foreign gateway operator and crediting the foreign currency payment amount to the account of the foreign receiving depositing institution.

16. The computer-implemented method according to claim 15, wherein
debiting the calculated amount of domestic currency from an account of the originating depository financial institution and crediting the calculated amount of domestic currency to an account of the foreign exchange agent comprises
debiting the calculated amount of domestic currency from the account of the originating depository financial institution and crediting the calculated amount of domestic currency to an account of the domestic gateway operator; and
debiting the calculated amount of domestic currency from the account of the domestic gateway operator and crediting the calculated amount of domestic currency to the account of the foreign exchange agent.

17. The computer-implemented method according to claim 12, wherein the foreign gateway operator credits an account of the foreign receiving depository financial institution in the foreign currency, the credit comprising the foreign currency payment amount.

18. A system for managing a foreign payment in an international automated clearinghouse ("ACH"), comprising:
a domestic gateway operator computer located in the United States and configured to receive an ACH item designating a payment amount from a domestic originating depository financial institution to a foreign receiving depository financial institution, the payment amount designated in a foreign currency; and
a conversion module operable to
interact with a foreign exchange agent to determine a foreign exchange conversion rate for the foreign currency, calculate an amount of domestic currency equivalent to the foreign currency payment amount based on the determined foreign exchange conversion rate, and enter the calculated amount of domestic currency into the ACH item, wherein the domestic gateway operator computer is further configured to electronically transmit the ACH item comprises comprising the foreign currency payment amount and the entered, calculated amount of domestic currency, from the domestic gateway operator to a foreign gateway operator, and debit the calculated amount of domestic currency from an account of the domestic originating depository financial institution and credit the calculated amount of domestic currency to an account of the foreign exchange agent, the foreign gateway operator is configured to debit the foreign currency payment amount from the account of the foreign exchange agent and credit the foreign currency payment amount to an account of the foreign receiving depositing institution, and at least one of the debited and credited amounts is varied to account for a fee or commission.

19. The system according to claim 18, wherein the domestic gateway operator computer further unbundles the ACH item from an ACH file in a NACHA file format.

20. The system according to claim 18, wherein the domestic gateway operator computer electronically transmits the ACH item, which comprises the entered, calculated amount of domestic currency, to the foreign gateway operator on a first banking day, and the foreign gateway operator coordinates the payment to the foreign receiving depository financial institution on a second banking day, which is later than the first banking day, wherein the foreign exchange conversion rate is guaranteed by the foreign exchange agent from the first banking day until at least the second banking day.

21. A system for managing a foreign payment in an international automated clearinghouse ("ACH"), comprising:

a domestic gateway operator computer located in the United States and configured to receive an ACH item designating a payment amount from a foreign depository financial institution to a domestic originating depository institution, the payment amount being designated in a domestic currency; and a conversion module operable to interact with a foreign exchange agent to determine a foreign exchange conversion rate for the domestic currency, calculate an amount of foreign currency equivalent to the domestic currency payment amount based on the determined foreign exchange conversion rate, and enter the calculated amount of foreign currency into the ACH item, wherein the domestic gateway operator computer is further configured to electronically transmit the ACH item comprising the domestic currency payment amount and the entered, calculated amount of foreign currency to a foreign gateway operator, and debit the calculated amount of domestic currency from an account of the foreign exchange agent and credit the calculated amount of domestic currency to an account of the domestic originating depository institution, the foreign gateway operator is configured to debit the foreign currency payment amount from the account of the foreign depository financial institution and credit the foreign currency payment amount to an account of the foreign exchange agent, and at least one of the debited and credited amounts is varied to account for a fee or commission.

22. The system according to claim 21, wherein the domestic gateway operator computer further unbundles the ACH item from an ACH file in a NACHA file format.

23. The system according to claim 21, wherein the domestic gateway operator electronically transmits the ACH item to the foreign gateway operator on a first banking day, and the foreign gateway operator coordinates payment from the receiving depository institution on a second banking day, which is later than the first banking day, wherein the foreign exchange conversion rate is guaranteed by the foreign exchange agent from the first banking day until at least the second banking day.

24. A computer-implemented method for managing a foreign payment in an international automated clearinghouse ("ACH"), comprising the steps of:

receiving at a domestic gateway operator an ACH item designating, in a domestic currency, a payment amount to be transmitted from a foreign depository financial institution located in a foreign country to an originating depository financial institution located in the United States, and including an amount of foreign currency equivalent to the domestic currency payment amount, the amount of foreign currency determined based on a foreign exchange conversion rate provided by a foreign exchange agent;

crediting, by a computer software module of the domestic gateway operator, the domestic currency payment amount to an account of the originating depository financial institution and debiting, by the computer software module, the domestic currency payment amount from an account of the foreign exchange agent;

electronically transmitting the ACH item to a foreign gateway operator located in the foreign country, the foreign gateway operator coordinating payment from the foreign receiving depository financial institution and debiting, by a computer software module of the foreign gateway operator, the foreign currency payment amount from an account of the foreign depository financial institution and crediting, by the computer software module of the foreign gateway operator, the foreign currency payment amount to an account of the foreign exchange agent, wherein the computer software modules are implemented in at least one computer system that comprises instructions stored in a machine-readable medium and a processor that executes the instructions, and at least one of the debited and credited amounts is varied to account for a fee or commission.

25. The computer-implemented method according to claim 24, wherein the step of receiving at the domestic gateway operator the ACH item comprises the step of unbundling the ACH item from an ACH file in a NACHA file format.

26. The computer-implemented method according to claim 24, wherein the step of electronically transmitting the ACH item occurs on a first banking day, and the foreign gateway operator coordinates payment from the receiving depository institution on a second banking day, which is later than the first banking day, wherein the foreign exchange conversion rate is guaranteed by the foreign exchange agent from the first banking day until at least the second banking day.

27. A computer-implemented method for managing a foreign payment in an international automated clearinghouse ("ACH"), comprising the steps of:
- receiving at a domestic gateway operator located in the United States an ACH item from a foreign depository financial institution, via a foreign gateway operator, the ACH item designating, in a foreign currency, a payment amount being transmitted from the foreign depository financial institution to a domestic depository financial institution;
- interacting with a foreign exchange agent to determine a foreign exchange conversion rate for the foreign currency;
- calculating, by a conversion module, an amount of domestic currency equivalent to the foreign currency payment amount based on the determined foreign exchange conversion rate;
- entering, by the conversion module, the calculated amount of domestic currency into the ACH item;
- electronically transmitting the ACH item comprising the foreign currency payment amount and the entered, calculated amount of domestic currency from the domestic gateway operator to the domestic depository financial institution;
- debiting the calculated amount of domestic currency from an account of the foreign exchange agent and crediting the calculated amount of domestic currency to an account of the domestic depository financial institution; and
- debiting the foreign currency payment amount from an account of the foreign depository financial institution and crediting the foreign currency payment amount to an account of the foreign exchange agent, wherein
- the conversion module is implemented in a computer system that comprises instructions stored in a machine-readable medium and a processor that executes the instructions, and
- at least one of the debited and credited amounts is varied to account for a fee or commission.

28. The computer-implemented method according to claim 27, wherein the step of receiving at the domestic gateway operator the ACH item comprises the step of unbundling the ACH item from an ACH file in a NACHA file format.

29. The computer-implemented method according to claim 27, wherein the step of electronically transmitting the ACH item occurs on a first banking day, and the step of crediting the account of the domestic originating depository financial institution occurs on a second banking day, which is later than the first banking day,
- wherein the foreign exchange conversion rate is guaranteed by the foreign exchange agent from the first banking day until at least the second banking day.

30. A computer-implemented method for managing a foreign payment in an international automated clearinghouse ("ACH"), comprising the steps of:
- receiving at a domestic gateway operator located in the United States an ACH item from a receiving depository financial institution, via a foreign gateway operator, the receiving depository financial institution located in a foreign country, the ACH item designating, in a foreign currency, a payment amount to be transmitted to the receiving depository financial institution from a domestic depository financial institution;
- interacting with a foreign exchange agent to determine a foreign exchange conversion rate for the foreign currency;
- calculating, by a conversion module, an amount of domestic currency equivalent to the foreign currency payment amount based on the determined foreign exchange conversion rate;
- entering, by the conversion module, the calculated amount of domestic currency into the ACH item;
- electronically transmitting the ACH item comprising the entered, calculated amount of domestic currency from the domestic gateway operator to the domestic originating depository financial institution;
- crediting the calculated amount of domestic currency to an account of the foreign exchange agent and debiting the calculated amount of domestic currency from an account of the domestic; depository financial institution; and
- debiting the foreign currency payment amount from the account of the foreign exchange agent and crediting the foreign currency payment amount to an account of the receiving depositing institution, wherein
- the conversion module is implemented in a computer system that comprises instructions stored in a machine-readable medium and a processor that executes the instructions, and
- at least one of the debited and credited amounts is varied to account for a fee or commission.

31. The computer-implemented method according to claim 30, wherein the step of receiving at the domestic gateway operator the ACH item comprises the step of unbundling the ACH item from an ACH file in a NACHA file format.

32. The computer-implemented method according to claim 30, wherein the step of electronically transmitting the ACH item occurs on a first banking day, and the step of debiting the account of the domestic originating depository financial institution occurs on a second banking day, which is later than the first banking day,
- wherein the foreign exchange conversion rate is guaranteed by the foreign exchange agent from the first banking day until at least the second banking day.

* * * * *

UNITED STATES PATENT AND TRADEMARK OFFICE
CERTIFICATE OF CORRECTION

| | | |
|---|---|---|
| PATENT NO. | : 8,560,441 B2 | Page 1 of 1 |
| APPLICATION NO. | : 12/148204 | |
| DATED | : October 15, 2013 | |
| INVENTOR(S) | : Larry Schulz | |

It is certified that error appears in the above-identified patent and that said Letters Patent is hereby corrected as shown below:

In the Claims

Column 25, lines 7-8,

"electronically transmit the ACH item comprises comprising the foreign currency payment amount and the" should read -- electronically transmit the ACH item comprising the foreign currency payment amount and the --

Column 26, lines 40-41,

"gateway operator coordinating payment from the foreign receiving depository financial institution and" should read -- gateway operator coordinating payment from the foreign receiving depository financial institution; and --

Column 28, line 27,

"account of the domestic; depository financial institution;" should read -- account of the domestic depository financial institution; --

Signed and Sealed this
Twentieth Day of May, 2014

Michelle K. Lee
*Deputy Director of the United States Patent and Trademark Office*